United States Patent
Yoshina et al.

(10) Patent No.: US 6,257,084 B1
(45) Date of Patent: Jul. 10, 2001

(54) TRANSMISSION

(75) Inventors: Atsuo Yoshina, Osaka-fu; Motohiko Ito, Shiga-ken, both of (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 0 days.

(21) Appl. No.: 09/188,040

(22) Filed: Nov. 6, 1998

(30) Foreign Application Priority Data

| Nov. 21, 1997 | (JP) | 9-321453 |
| Feb. 3, 1998 | (JP) | 10-022007 |
| Feb. 5, 1998 | (JP) | 10-023716 |
| Apr. 8, 1998 | (JP) | 10-096027 |

(51) Int. Cl.[7] .......................... F16H 3/091; F16H 63/20; F16H 63/36
(52) U.S. Cl. ..................... 74/359; 74/473.1; 74/473.25
(58) Field of Search .................. 74/373, 374, 375, 74/359, 360, 473.1, 473.15, 483 R, 325, 330, 331, 333

(56) References Cited

U.S. PATENT DOCUMENTS

| 4,094,206 | * | 6/1978 | Sogo et al. ........................ 74/360 |
| 4,287,791 | * | 9/1981 | Numazawa et al. ............... 74/375 X |
| 4,515,031 | * | 5/1985 | Janson ............................... 74/375 X |
| 4,543,844 | * | 10/1985 | Inui et al. ........................... 74/473.1 |
| 4,558,610 | * | 12/1985 | Takahashi .......................... 74/473.1 |
| 4,605,109 | * | 8/1986 | Fukuchi et al. .................. 74/473.1 X |
| 4,757,726 | * | 7/1988 | Yamaguchi et al. ............... 74/473.1 |
| 4,771,648 | * | 9/1988 | Bardoll ............................. 74/375 X |
| 5,722,291 | * | 3/1998 | Fraley et al. ........................ 74/325 |

FOREIGN PATENT DOCUMENTS

| 57-53929 | 3/1982 | (JP) . |
| 4-358928 | 12/1992 | (JP) . |
| 9-193679 | 7/1997 | (JP) . |

* cited by examiner

*Primary Examiner*—Charles A Marmor
*Assistant Examiner*—Ankur Parekh
(74) *Attorney, Agent, or Firm*—Knobbe, Olson, Martens & Bear, LLP

(57) ABSTRACT

A transmission 1 includes: a casing 2 and rotatable shafts 50, 60, 70. A drive gear of a reversing gear train 24 and a drive gear of a first speed gear train 25 are fixed on the input shaft 50. The gear change mechanism for 1st speed operation is constituted by he fixed 1st gear 25, a rotatable 1st gear 22, and a synchromesh device 20 supported on the intermediate shaft 60. The gear change mechanism for reversing operation is constituted by the fixed reversing gear 24, a rotatable reversing gear 21, and the synchromesh device 20. An idle gear 66 is rotatably supported on an idle shaft 65 that is supported by a wall of housing 511 adjacent to the reversing gear.

10 Claims, 28 Drawing Sheets

FIG. 5
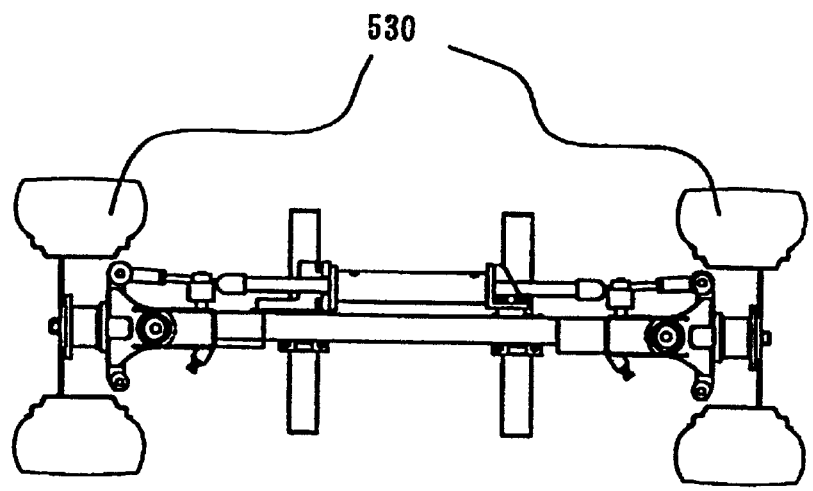
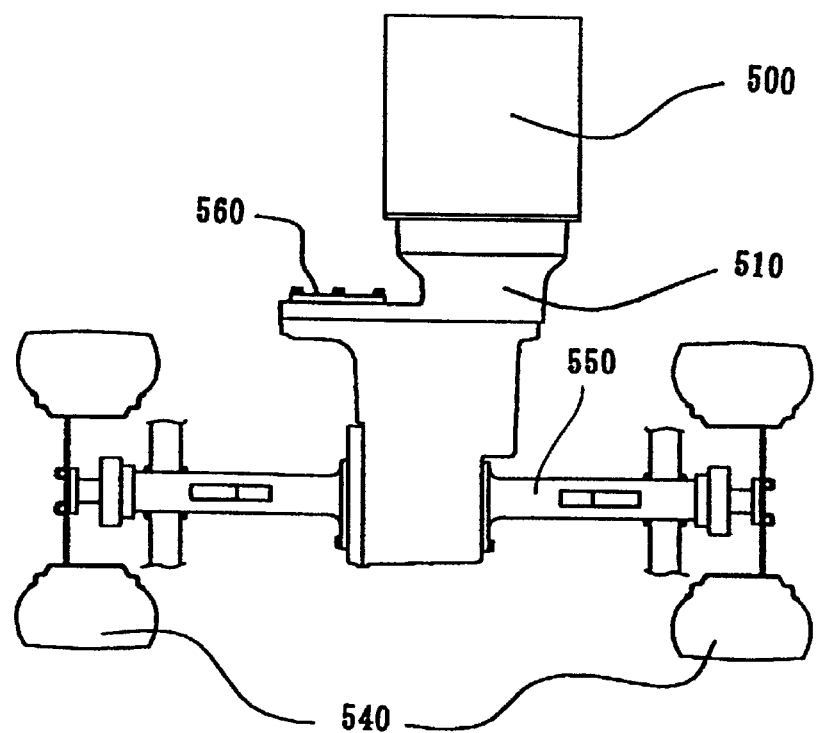

F I G. 1 6
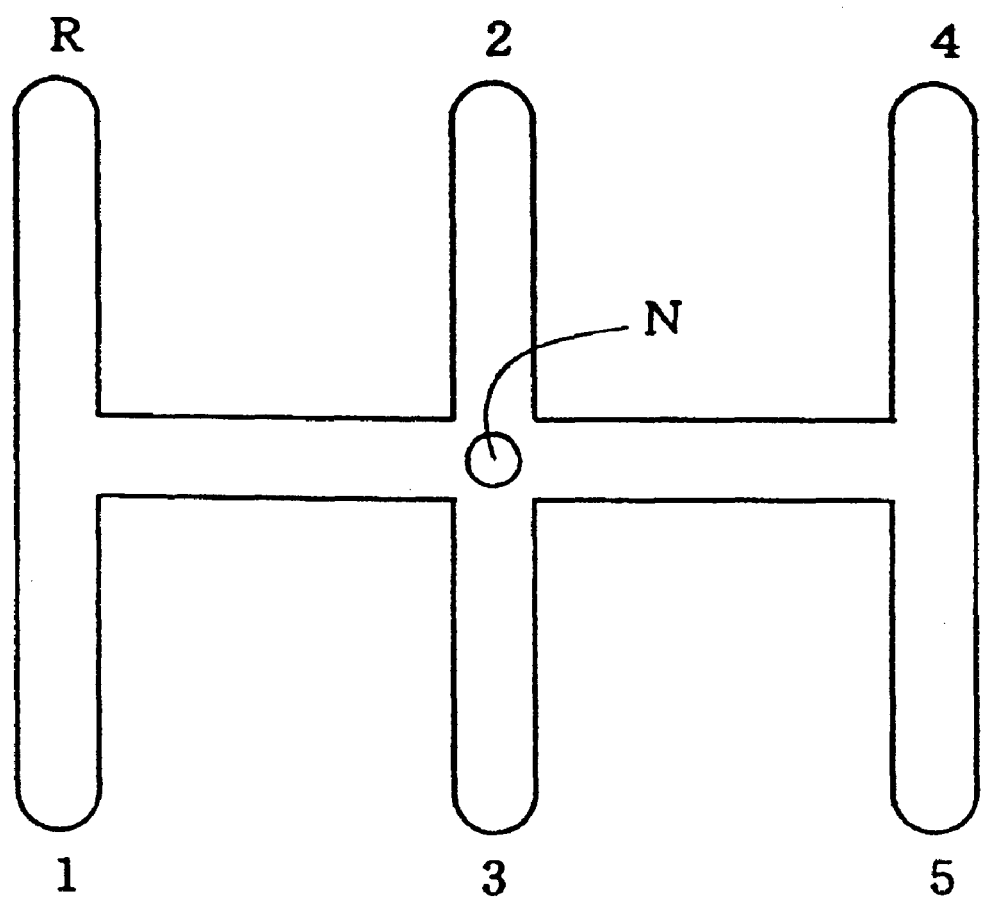

TRANSMISSION

DETAILED DESCRIPTION OF THE INVENTION

The present invention concerns a transmission for use on a vehicle such as a tractor.

PRIOR ART

Prior Art 1

In the transmission technique, it is conventionally known to change the rotation of a power source to a desired rotational speed by using a gear type change speed mechanism provided with a synchromesh device and then transmit the modified rotation to the axles.

The gear type change speed mechanism is, as described in FIG. 2, a device for changing a speed with a gear train located between a drive shaft 110 and a driven shaft 120 which shafts are disposed substantially in parallel to each other, the gear type change speed mechanism comprising a rotatable gear 101 relatively rotatably supported on one of the above mentioned shafts, a synchromesh device 100 supported on the said one of the above-mentioned shafts so as to be axially slidable but non-rotatable relative thereto, and a fixed gear 102 supported on the other of the shafts in a non-rotatable manner relative thereto and operatively connected to the rotatable gear. FIG. 2 shows a change speed gear mechanism of the type in which a pair of rotatable gears share one synchromesh device.

The synchromesh device 100 has an inner tapered engaging face 100a and internal teeth 100b. The rotatable gear 101 is provided with an outer tapered engaging face 101a and external teeth 101b corresponding to the inner tapered face and the internal teeth of the synchromesh device, respectively. The synchromesh device 100 is moved axially so that the tapered engaging face 100a is pressed on the tapered face 101a of the rotatable gear. Then, both the engaging faces are synchronized through frictional engagement so as to mesh the internal teeth 100b with the external teeth 101b, whereby the rotatable gear is synchronized with the one shaft to obtain a change speed ratio between the drive shaft and the driven shaft based on the gear ratio between the rotatable gear and the fixed gear operatively coupled therewith. In the figure, the reference numeral 121 denotes an output gear integrally formed with a driven shaft 120.

As described above, the synchromesh device is designed so that the tapered engaging face 100a is frictionally engaged with the engaging face 101a of the rotatable gear and consequently the internal teeth 100b is meshed with the external teeth 101b of the rotatable gear. Accordingly, both the synchromesh device and the rotatable gear are subjected to load with some torque in meshing with each other. By the way, the engine output to be transmitted to the transmission is proportional to the product of a torque and a rotational speed of the engine. Accordingly, in order to reduce the load applied on the rotatable gear and the synchromesh device, it is desirable that both the members are connected on the drive shaft that rotates at a higher rotational speed than a driven shaft. Thus, for this reason, according to the conventional transmission, the synchromesh device and the rotatable gear in all the speed change gear mechanism are provided on the drive shaft. Such a construction has encountered the following disadvantages.

Specifically, the change gear ratio is denoted by the gear ratio between the meshing gears, whereas the pitches of the meshing gears are equal. Accordingly, the gear ratio is indicated by the ratio between the pitch circle diameters thereof. Therefore, in order to reduce the distance between the drive shaft and the driven shaft while maintaining a given gear ratio, it is necessary to reduce the pitch circle diameters of the meshing gears as much as possible while maintaining the ratio between the pitch circle diameters thereof. In the case where the transmission is of the multi speed type, since the gear ratio for the 1st speed (or the reversing) is the highest, the 1st speed gear (or the reversing gear) supported on the drive shaft has the smallest pitch circle diameter. Accordingly, it is possible to make the whole transmission compact by reducing the pitch circle diameter of the 1st speed gear supported on the drive shaft.

However, if the pitch circle diameter is reduced, the thickness of the portion (hereinafter referred as "the body portion of the gear") sandwiched between the position defined by the pitch circle radius and the position defined by the radius of the center hole is reduced. Accordingly, if the pitch circle diameter is reduced excessively, the gear is deficient in strength. Further, it is necessary to attach a rotatable member such as a bearing between the gear and the drive shaft in order to support the gear rotatably relative to the drive shaft. Therefore, it is necessary to take into consideration the minimum required thickness of the body portion and also the thickness of the rotatable member in addition to the gear ratio so as to determine the pitch circle diameter of the gear in a gear type change speed mechanism.

For example, provided that the minimum required thickness of the body portion of the 1st speed gear on the drive shaft, the thickness of the rotatable member and the radius of the drive shaft are denoted at "h", "t" and "r", respectively, the pitch circle diameter D1 of the 1st speed gear supported on the drive shaft is expressed by $D1=2(r+t+h)$. Provided that the change gear ratio is "5", the pitch circle diameter D2 of the 1st speed gear mounted on the driven shaft is expressed by $D2=5D1=10(r+t+h)$. Accordingly, the distance L1 between the drive shaft and the driven shaft is expressed by $L1=(D1+5D1)/2=6(r+t+h)$. Thus, according to the prior art construction in which the rotatable gears of all the change speed gear mechanisms are mounted on the drive shaft, the actual distance between the drive and driven shafts is larger than the distance $6(r+h)$ determined only based on the change gear ratio and the gear strength by 6 times as the thickness "t" of the rotatable member, thereby increasing the size of the whole transmission.

Further, since both the engaging faces of the rotatable gear and the synchromesh device are frictionally engaged with each other, before meshing the external teeth of the rotatable gear with the internal teeth of the synchromesh device, both the engaging faces are required to have an adequate radial thickness from the view of strength. Therefore, from the point of this, in order to rotatably mount the gear of the minimum pitch circle diameter on the drive shaft, the diameter of the gear has to be greater than the diameter that can be determined based on only the gear ratio. This results in further increased size of the whole transmission itself.

Prior Art 2

In order to obtain the drive power for driving the front wheels, it has been known, as disclosed in Japanese Unexamined Patent Publication No. 193679/97, to mount a front wheel drive unit on the transmission of the type that transmits drive power from a drive source to a pair of rear wheels. However, the four wheel drive types and the two wheel drive types of the conventional transmission have been produced in separate production lines.

Specifically, since it Is necessary to determine whether to install the front drive unit within the transmission casing depending on the four wheel type or the two wheel type before assembling the transmission, the four wheel types and the two wheel types have to be produced in separate lines. Accordingly, the conventional transmission has encountered difficulties in enhancing the assembling efficiency of the transmission or in enhancing the stock management efficiency.

Further, with this construction, when a customer wishes to change the specifications of the transmission mounted, i.e., he wishes to change the two wheel drive type to the four wheel drive type or vice verse after the transmission is assembled, it is necessary to attach or detach the front wheel drive unit after disassembling of the transmission itself. Accordingly, it is difficult to change the specifications of the transmission after a vehicle is shipped.

Prior Art 3

It is conventionally known to slide a synchromesh device of a gear type change speed mechanism by using a shift fork or a control arm so as to change the rotational speed of a transmission. Japanese Unexamined Patent Publication No. 358928/92, for example, discloses such a technique.

However, according to the disclosed transmission, the opening is formed in the upper portion of the transmission casing, and the cover closing the opening supports a select shaft (shift shaft) and a select lever (shift lever). The transmission disclosed has drawbacks in assembling efficiency and is costly due to the increased numbers of assembling steps and parts. More specifically, according to the disclosed transmission, the transmission cover is first provided with i) the select shaft supporting a change speed lever as to be axially slidable but non-rotatable relative thereto and ii) a select lever engaging one end of the change speed lever and axially sliding the change speed lever. Secondly, with this state, the other end of the change speed lever is engaged with the engaging portion of the shift fork. Accordingly, it is difficult to assemble the transmission. Further, the transmission requires a transmission cover as an additional member, which results in an increased number of parts and an increased cost. Furthermore, in order to withdraw the select shaft, the transmission cover need to be detached, whereby the maintenance efficiency of the transmission be lowered.

Prior Art 4

It is conventionally known to provide, in a gear type transmission, an interlock mechanism for preventing the double-meshing of change speed gears. Further, it is a conventional practice to provide, in the transmission comprising the interlock mechanism, a detent mechanism for preventing a fork shaft from sliding abruptly and giving responses to the operator during change speed operation.

FIG. 28 is a perspective view of the interlock mechanism and the detent mechanism of the transmission, as viewed from a direction perpendicular to fork shafts 601, 602 and 603. As shown in FIG. 28, the conventional transmission has a hanger member 600 detachably mounted on the casing, which member supports one end of the fork shaft and is provided with the interlock mechanism, thereby having the following problems.

That is, as shown in the figure, the hanger member 600 comprises first, second and third shaft holes 604, 605 and 606 formed axially of the shaft forks so as to support one ends of the first, second and third fork shafts 601, 602 and 603, respectively; detent guide holes 607, 608 and 609 extending perpendicular to the axes of the fork shafts from the upper end of the hanger member so as to communicate the respective shaft holes with the upper end of the hanger member, and two interlock guide holes extending perpendicular to the axes of the fork shafts from the side of the hanger member so as to communicate the respective two holes from among the shaft holes (FIG. 28 shows only one interlock guide hole).

Interlock plungers 611 and 612 of spherical shape are provided in the interlock guide hole between the first and second fork shafts and between the second and third fork shafts, respectively. In the other interlock guide hole, an interlock plunger of bar shape is provided between the first and third fork shafts. All these interlock plungers constitute an interlock plunger mechanism.

Further, the respective detent guide holes are provided with closing means 613 such as a bolt for closing the guide hole, detent plungers 614 inserted between the fork shafts and the closing means, biasing means 615 for biasing the detent plungers on the fork shafts. All these members constitute a detent mechanism.

In order to assemble the thus constructed transmission, the first fork shaft 601 is inserted into the first shaft hole 604. Next, the 1st–2nd shaft interlock plunger 611 is inserted from the interlock guide hole 610 extending vertically from the shaft hole 604 and the second fork shaft 602 is inserted into the second shaft hole 605, with the plunger 611 being maintained at the mid position between the first shaft hole 604 and the second shaft hole 605. Thereafter, the 2nd–3rd interlock plunger 612 is inserted from the interlock guide hole 610. The interlock plunger 612 is maintained at the mid position between the second shaft hole 605 and the third shaft hole 606. The 1st–3rd interlock plunger is inserted from the other interlock guide hole (not shown). With the 1st–3rd interlock plunger being at the mid portion between the first shaft hole 604 and the third shaft hole 606, the third fork shaft 603 is inserted into the third shaft hole 606. Thus, according to the conventional transmission, it is necessary to attach fork shafts together with disposing interlock plungers. Therefore, the assembling of the interlock mechanism requires much labor, thereby lowering assembling efficiency of the transmission and increasing the production cost.

Further, according to the hanger member 600, it is necessary to make holes in three directions, i.e., shaft holes, detent guide holes and interlock guide holes, which takes time. Accordingly, the transmission itself employing the hanger member is costly.

SUMMARY OF THE INVENTION

In view of Prior Art 1, the object of the present invention is to provide a transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other; the transmission comprising a plurality of gear type change speed devices each of which has a rotatable gear supported on one of the drive and driven shafts; a synchromesh device supported on the one of said drive and driven shafts so as to be axially slidable but non-rotatable relative thereto, the synchromesh device being designed to be synchronizedly connected with the corresponding rotatable gear by a friction face and thereafter a meshing portion provided on the rotatable gear; and a fixed gear supported on the other shaft of the drive and driven shafts in a non-rotatable manner and operatively coupled to the corresponding rotatable gear; the synchromesh device of selected one of the plurality of gear type change speed devices is moved to mesh with the corresponding rotatable gear such that the rotatable gear is synchronized with said one of the shafts and rotate the driven shaft at a desired speed via the corresponding fixed gear operatively coupled the rotatable gear; and i) at least the rotatable gear operatively coupled to the corresponding fixed gear having the smallest pitch circle diameter among the plurality of fixed gears and ii) the synchromesh device corresponding to the rotatable gear is mounted on the driven shaft.

In view of Prior Art 2, preferably, the output shaft is designed such that the drive power transmitted from the input shaft is transmitted to a pair of rear axles; the casing has a through hole formed in its front wall; a power take off gear for the front axles is supported on the output shaft non-rotatably relative thereto; and at least teeth end of the power take off gear face the through hole such that when one end of the front wheel drive shaft supporting a transmission gear is inserted into the through hole, the power take off gear face is capable of meshing with the transmission gear.

In view of Prior Art 3, preferably, the casing has an opening at its front end and an operating device is provided in the casing to operate the gear type change speed devices, the operating device comprising: a plurality of shift forks to engage the synchromesh devices of the gear type change speed devices; a plurality of fork shafts supporting each of the shift forks in a longitudinally slidable manner; a control member having an arm to engage a selected one of the receiving portions formed in the shift forks; and a shift shaft supporting the control member in axially slidable but non-rotatable manner relative to the shift shaft, the fork shafts being supported by a rear wall of the transmission casing and a closure wall closing the front opening of the transmission casing, and the shift shaft being supported by opposing side walls of the transmission casing rotatably relative thereto.

In view of Prior Art 4, preferably, the casing comprises opposing front and rear walls and opposing two side walls that are provided substantially vertically, a plurality of fork shafts supported in parallel and axially slidable by shaft holes formed in the two opposing walls of the casing, and an interlock mechanism having an interlock plunger disposed between the respective two fork shafts to prevent the simultaneous movement of the fork shafts; the casing having an extension on at least one of the walls having the shaft holes which extension extends outwardly from a portion of the wall below the shaft hole; the respective fork shafts having a projection that further extends outwardly beyond the shaft hole and is located above the extension; the interlock plungers being disposed between the projections of the fork shafts; the extension having holding portions that make the interlock plungers disposed between the respective two fork shafts and enable the interlock plungers only to move in a direction perpendicular to the respective two forks hafts, each of the holding portions having an upper portion that opens to insert the interlock plunger.

BRIEF DESCRIPTION OF THE DRAWINGS

FIG. 5 is a view schematically showing the 2WD type vehicle in which the transmission shown in FIG. 1 is mounted;

FIG. 16 is a view showing shift positions of a change speed lever;

DETAILED DESCRIPTION OF THE PREFERRED EMBODIMENTS

Embodiment 1

Figure 1:
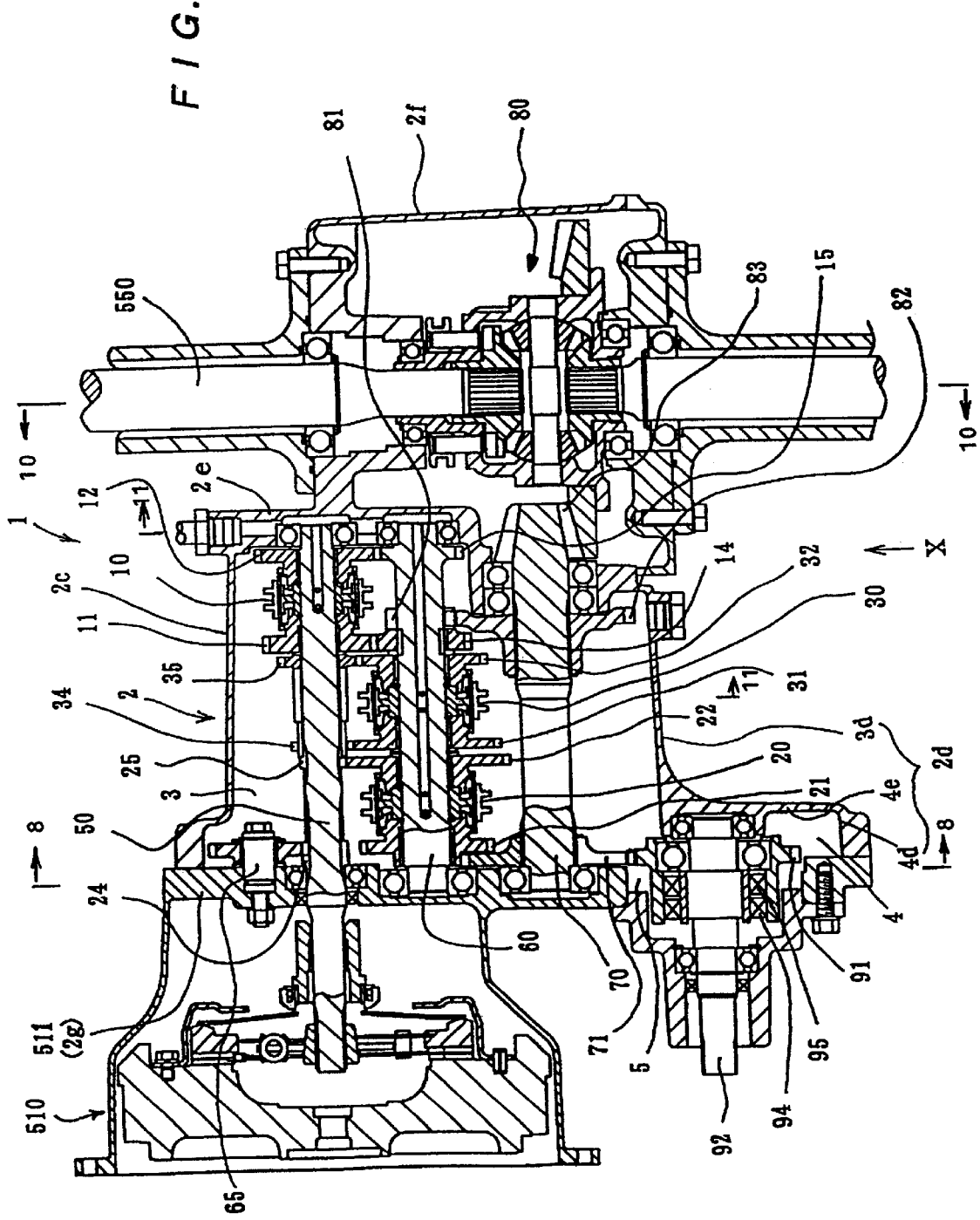
FIG. 1 is a plan cross section of the transmission according to Embodiments 1–3.
Figure 2:
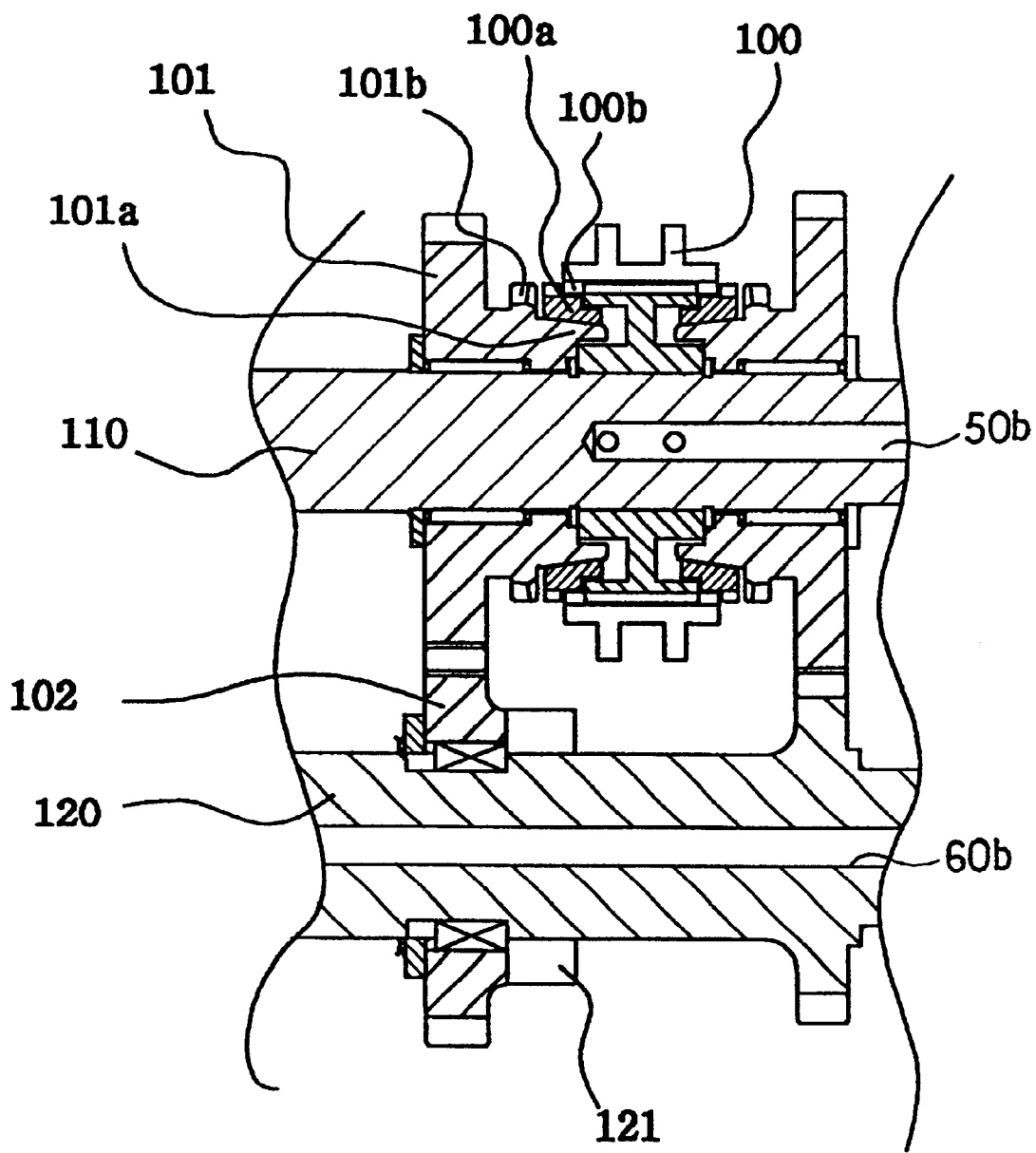
FIG. 2 is an enlarged cross section of a synchromesh device.

Explained below is a preferred embodiment for solving the problem in the Prior Art 1 with reference to FIGS. 1 and 2. FIG. 1 is a plan cross section of the transmission of one embodiment of the present invention, and FIG. 2 is an enlarged cross section of a synchromesh device.

As shown in FIG. 1, a transmission 1 of the present embodiment comprises i) an input shaft 50 disposed longitudinally of a vehicle so as to receive drive power from a power source and ii) an intermediate shaft 60 disposed substantially in parallel to the input shaft and driven by the input shaft.

In the relationship between the input and intermediate shafts, the input shaft acts as a drive shaft located to the power source. Rotatably supported on this drive shaft, i.e., the input shaft 50 are a rotatable 4th gear 11 and a rotatable 5th gear 12 that have different numbers of teeth. Provided between the pair of rotatable gears is a synchromesh device 10 which is slidable relative to the input shaft 50 but non-rotatable relative thereto.

On the other hand, in the relationship between the input and intermediate shafts, the intermediate shaft acts as a driven shaft. Supported on this driven shaft, i.e., the intermediate shaft 60 are a gear pair consisting of a rotatable reversing gear 21 and a rotatable 1st speed gear 22 and a gear pair consisting of a rotatable 2nd speed gear 31 and a rotatable 3rd speed gear 32, these gear pairs having different numbers of teeth and being rotatable relative to the intermediate shaft 60. Provided between the respective pairs of rotatable gears are synchromesh devices 20 and 30 that are axially slidable but non-rotatable relative to the intermediate shaft 60.

Further, the transmission 1 comprises an output shaft 70 disposed substantially in parallel to the intermediate shaft 60. The output shaft 70 is connected to the intermediate shaft 60 via fixed gears 81 and 82 and also connected to a differential gear 80 via an output gear 83 provided at the rear end of the output shaft 70.

The respective synchromesh devices 10, 20 and 30 comprise, on their opposite sides, a tapered engaging face and internal teeth that are similar to a tapered engaging face 100a and internal teeth 100b shown in FIG. 2. Each rotatable gear is provided with a tapered engaging face and external teeth that are complementary to those of the corresponding synchromesh device. Either one of the synchromesh devices 10, 20 and 30 is slid in one axial direction so as to press its tapered engaging face on the tapered engaging face of one of the rotatable gears, whereby the one of rotatable gears is gradually synchronized with the synchromesh device through frictional engagement between the engaging faces, so that the internal teeth and the external teeth mesh with each other for synchronized rotation.

Provided on the input shaft 50 non-rotatably relative thereto are a fixed reversing gear 24, a fixed 1st speed gear 25, a fixed 2nd speed gear 34 and a fixed 3rd speed gear 35. Further, provided on the intermediate shaft 60 non-rotatably relative thereto is a fixed 4th speed gear 14 and a fixed 5th speed gear 15.

The forward speed change gears 11, 12, 22, 31 and 32 among the above rotatable gears are in constant mesh with the fixed gears 14, 15, 25, 34, and 35 supported on the other shaft non-rotatably relative thereto, and the reversing gear 21 is connected to the fixed gear 24 supported on the other shaft non-rotatably relative thereto via a direction-change gear rotatably fitted to an idle shaft.

Thus, the gear type change speed mechanism relating to reversing operation is constituted by the fixed reversing gear 24, the rotatable reversing gear 21 and the synchromesh device 20, and the change speed gear mechanism relating to 1st speed operation is constituted by the fixed 1st gear 25, the rotatable 1st gear 22 and the synchromesh device 20, and the change speed gear mechanism relating to 2nd speed operation is constituted by the fixed 2nd speed gear 34, the rotatable 2nd speed gear 31 and the synchromesh device 30. Further, the change speed gear mechanism relating to 3rd speed operation is constituted by the fixed 3rd speed gear 35, the rotatable 3rd speed gear 32 and the synchromesh device 30. The change speed gear mechanism relating to 4th speed operation is constituted by the rotatable 4th gear 11, the synchromesh device 10 and the fixed 4th gear 14, and the change speed gear mechanism relating to 5th speed operation is constituted by the rotatable 5th gear 12, the synchromesh device 10 and the fixed 5th gear 15.

According to the thus constructed transmission of the present embodiment, the change speed gear mechanism having the maximum reduction gear ratio, i.e., the gear type change speed mechanism relating to reversing operation and the gear type change speed mechanism relating to 1st speed operation employ fixed gears (denoted at 24 and 25) as the gears mounted on their drive shafts, respectively. That is, employed as a fixed gear is the gear of the smallest pitch circle diameter among the gears constituting the change speed gear mechanism. Accordingly, a rotatable member need not be mounted on the gear of the smallest pitch circle diameter. In this construction, provided that the minimum required thickness of the body portion of the gear of the smallest pitch circle diameter is "$h_0$", and that the radius of the drive shaft is "r", the pitch circle diameter $D_2$ of the 1st speed gear to be mounted on the drive shaft is $D_2=2(r+h_0)$. Therefore, provided that the change gear ratio of the reversing operation and 1st speed operation is "5", the distance $L_0$ between the drive shaft and the driven shaft is denoted by $L_0=(r+h_0)+5(r+h_0)=6(r+h_0)$. Comparing with that of a prior art transmission, $h_0$ is substantially equal to r. Accordingly, $\Delta L=L_1-L_0=6t$ so that the drive shaft and the driven shaft can be arranged close to each other by 6 times the thickness of the rotatable member. Thus, according to the transmission of the present embodiment, it is possible to make the transmission itself compact due to the above construction.

Further, according to the present embodiment, as shown in FIG. 1, the driven shaft carries rotatable gears and synchromesh mechanisms of the speed reduction mechanisms, i.e., the gear type change speed mechanisms relating to reversing operation, 1st speed operation, 2nd speed operation and 3rd speed operation, and the drive shaft carries the rotatable gears and the synchromesh devices of the speed increasing mechanism, i.e., the gear type change speed mechanism relating to 4th and 5th speed operations. This construction results from the consideration that it is possible that in the case of the gears other than that of the smallest pitch circle diameter, the radial dimensions are increased due to the provision of the rotatable members thereon. As described, according to the present embodiment, the respective gear type change speed mechanisms use, as a fixed gear, the gear of the smaller pitch circle diameter and use, as rotatable gears, the gear of the larger pitch circle diameter. Accordingly, it is possible to prevent the increase of the diameter of the smaller gear due to the provision of a rotatable member on the smaller gear, thereby further preventing the increase of the distance between the drive and driven shafts.

The present embodiment concerns the transmission of the type that comprises one synchromesh device per one pair of rotatable gears having different numbers of teeth. However, the present invention is not limited thereto but applicable to the transmission that comprises one synchromesh device per to one rotatable gear.

Embodiment 2

Figure 3:
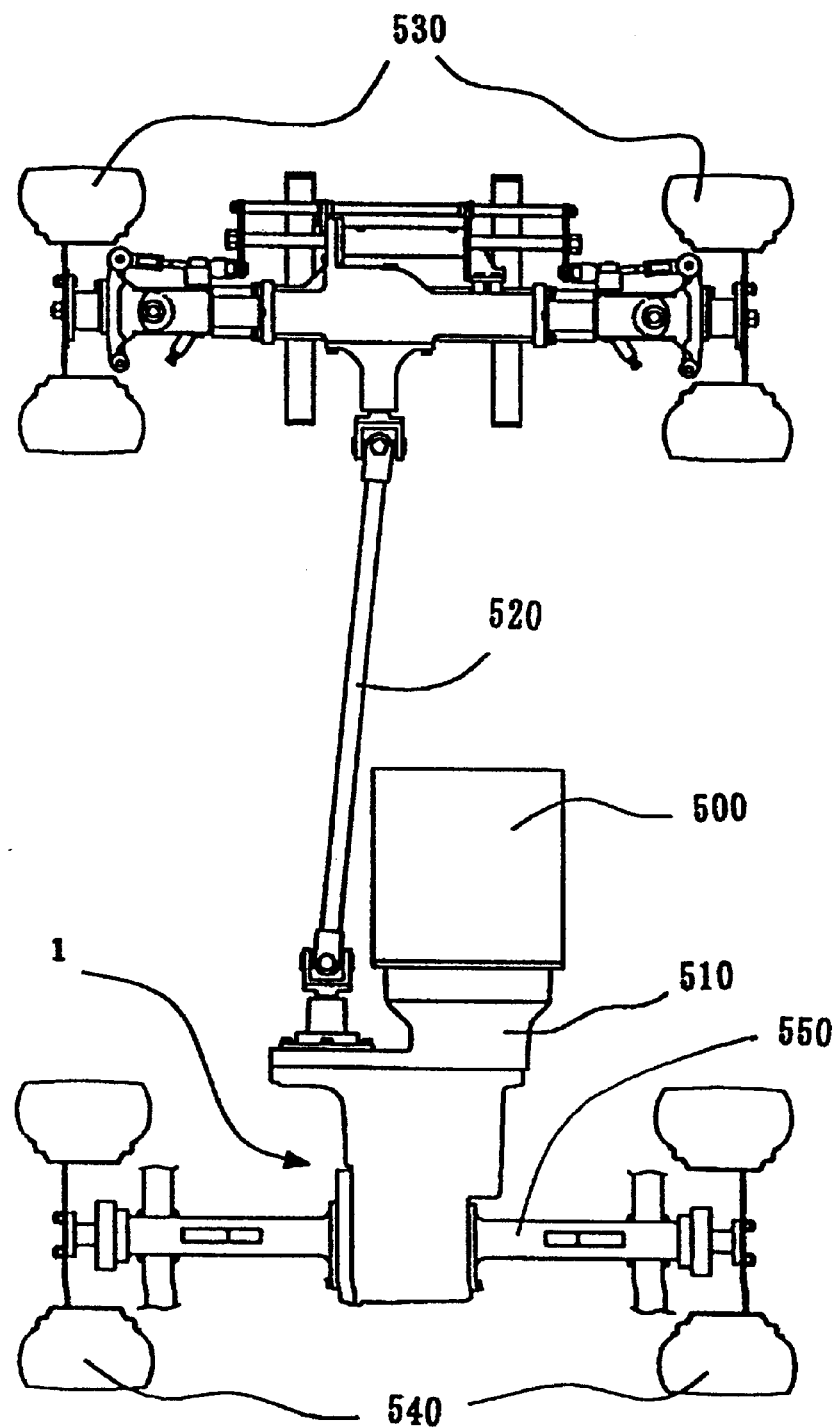
FIG. 3 is a view schematically showing the 4WD type vehicle in which the transmission shown in FIG. 1 is mounted.
Figure 4:
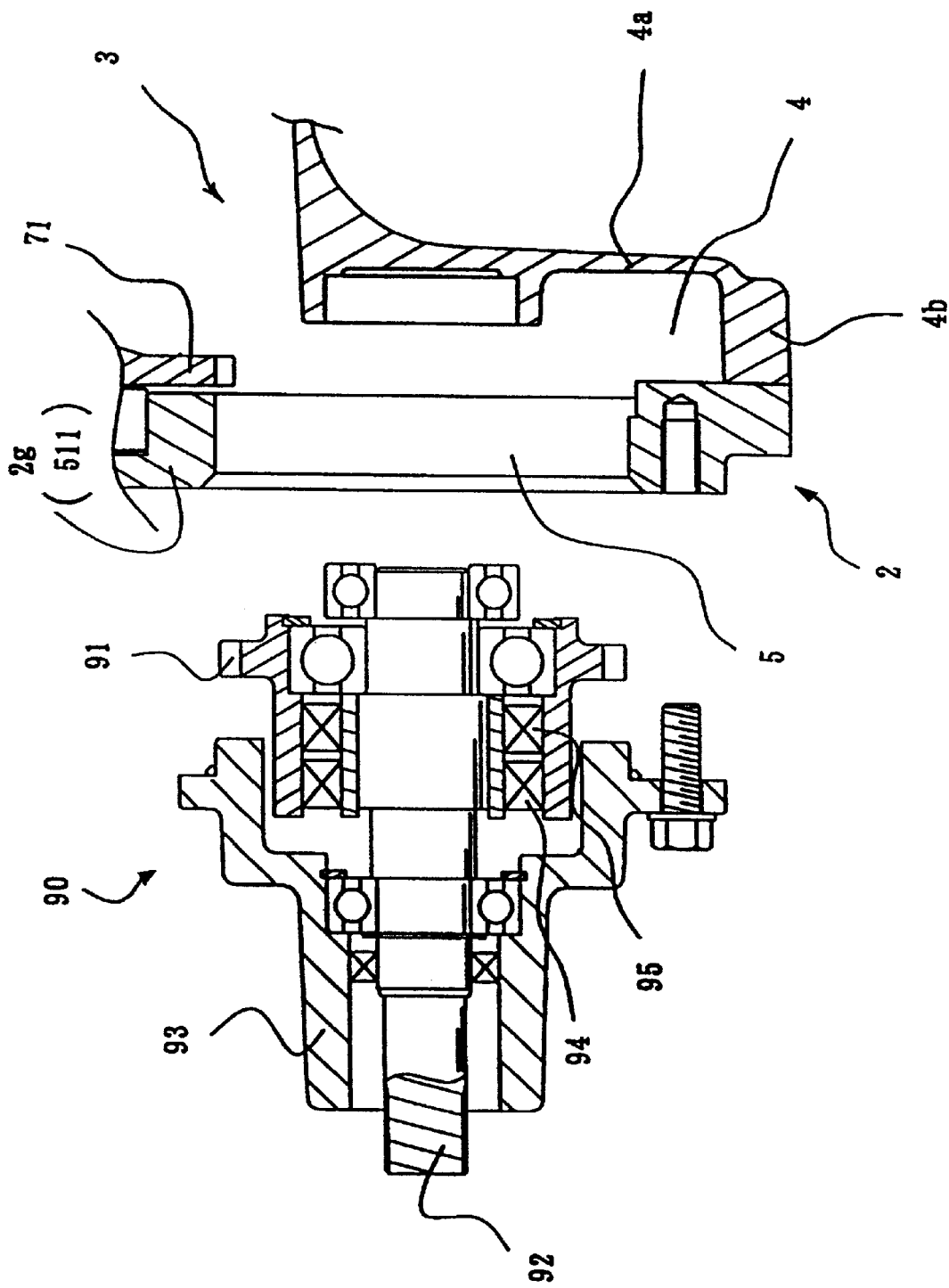
FIG. 4 is an enlarged view of the front wheel drive unit of the transmission shown in FIG. 1.

With reference to FIGS. 1 and 3–5, explained below is a preferred embodiment for solving an problem in Prior Art 2. FIG. 1 is a plan cross section of the transmission of one embodiment of the present invention; FIG. 3 is a view schematically showing a four wheel drive type vehicle on which the transmission shown in FIG. 1 is mounted; FIG. 4 is an enlarged view of the front wheel drive unit of the transmission; and FIG. 5 is a schematic view showing a two wheel drive type vehicle to the transmission is applied.

As shown in FIG. 3, the transmission 1 of one embodiment of the present invention is located directly and longitudinally behind a clutch 510 that introduces or shuts out drive power from an engine 500. In the figure, the reference numeral 530 denotes front wheels, 540 denotes rear wheels, and 520 denotes a propeller shaft for transmitting drive power from the transmission to the front wheels.

As shown in FIG. 1, the transmission 1 comprises a casing 2; an input shaft 50 disposed longitudinally of the vehicle in the casing and located to one side of the casing in a width direction of the vehicle; an intermediate shaft 60 and an output shaft 70 located to the other side of the casing in a width direction of the vehicle, these shafts being disposed in order of the input shaft, the intermediate shaft and the output shafts from one side to the other side of the casing in a width direction and substantially in parallel to each other.

The casing 2 comprises i) a body portion 3 for accommodating the input shaft 50, the intermediate shaft 60 and the output shaft 70 and ii) an extension 4 extending from the body portion 3 to the said other side of the casing in a width direction of the vehicle. The extension 4 has a rear wall 4e extending outwardly from the front end portion of a side wall 3d of the said other side of the body portion 3; and a side wall 4d extending forwardly from the outward end of the rear wall. The body portion 3 and the extension 4 of the casing are both opened at their front portion.

The front opening of the casing is closed by a clutch housing rear wall 511. The input shaft 50, the intermediate shaft 60 and the output shaft 70 are rotatably supported by the clutch housing rear wall 511 and a casing rear wall 2e, respectively. More specifically, the clutch housing rear wall 511 also forms a casing front wall 2g. The clutch housing rear wall 511 has an opening 5 formed in the portion facing the extension 4.

A gear pair consisting of the 4th speed gear 11 and the 5th speed gear 12 are supported on the input shaft 50 so as to be rotatable but non-slidable axially. On the other hand, the intermediate shaft 60 carries a gear pair consisting of the reversing gear 21 and the 1st speed gear 22 and a gear pair consisting of the 2nd speed gear 31 and the 3rd speed gear 32 that are supported so as to be rotatable but non-slidable axially. The respective gear pairs are provided with synchromesh devices 10, 20 and 30 between the two gears. The respective synchromesh devices 10, 20 and 30 are supported on the respective shafts so as to be axially slidable but non-rotatable relative thereto.

The input gear 50 carries gears 24, 25, 34 and 35 that are mounted non-rotatably relative thereto. The gears 24, 25, 34 and 35 are directly/indirectly meshed with the reversing gear 21, the 1st speed gear 22, the 2nd speed gear 31 and the 3rd speed gear 32. The intermediate shaft 30 carries gears 14 and 15 that are mounted non-rotatably relative thereto. The gears 14 and 15 are in constant meshed with the 4th speed gear 11 and the 5th gear 12. Accordingly, when one of the synchromesh devices 10, 20 and 30 is slid in one direction, the gear located on the one direction side is synchronously rotated with the synchromesh device, thereby obtaining a desired rotation of the intermediate shaft 60.

The intermediate shaft 60 is connected to the output shaft 70 via gears 81 and 82. Provided on the rear end of the output shaft 70 is an output gear 83 that is non-rotatable relative thereto. The output gear 83 meshes with an input gear of a differential device 80 that transmits drive force to a pair of wheels 550. On the other hand, supported at the front end of the output shaft 70 is a power take off gear 71 for taking off drive power for the front wheels which gear is mounted non-rotatable relative to the output shaft 70. The power take off gear 71 is arranged such that at least its teeth edges face the opening 5 of the rear wall 511 of the clutch housing, i.e., the front wall 2g of the casing, as shown in FIGS. 1 and 4.

In the extension 4 of the casing is provided a front wheel drive unit 90 which comprises a power transmission gear 91 meshing with the power take off gear 71 and a front wheel drive shaft 92 supporting the power transmission gear 91. The front wheel drive unit 90 is secured to the casing 2 by an attachment 93 that bears the front wheel drive shaft 92. The power transmission gear 91 has an outside diameter smaller than the opening 5 of the casing. The power transmission unit 90 has a diameter smaller than that of the hole 5 of the casing. Further, the front wheel drive shaft 92 is rotatably supported at its rear end by a rear wall 4e of the extension 4 via a bearing. Further, the front wheel drive unit 90 is provided, between the power transmission gear 91 and the front wheel drive shaft 92, with clutches 94 and 95 that allow the front wheel drive shaft 92 to rotate faster than the power transmission gear 91. It is preferable that these clutches are of the dual type, i.e., comprising i) the clutch 94 that operates during forwarding operation and ii) the clutch 95 that operates during reversing operation, as shown in FIGS. 1 and 4.

The thus constructed transmission of the present embodiment can achieve the following advantages:

That is, the hole 5 is formed in the front wall 2g of the transmission casing. The power take off gear 71, which synchronizes with the rear wheel drive system, is mounted such that at least the edges of its teeth face the hole 5, and the power transmission gear 91 meshing with the power take off gear 71 has a diameter smaller than that of the hole 5. Therefore, it is possible to change the vehicle specifications between the 4WD type and the 2WD type, with the engine or transmission being mounted on the vehicle frame. In other words, according to the present embodiment, it is possible to readily change the four wheel drive type to the two wheel drive type by attaching an opening closing plate 560 instead of the front wheel drive unit 90.

According to the above construction, manufacturers can prepare only the two wheel drive type transmissions in factory. If there is an order for four wheel drive transmissions, they have only to mount the front wheel drive units on the two wheel drive transmissions, whereby the assembling and storage efficiency can greatly be improved, and also the production cost can greatly be reduced because of using common parts therebetween, such as the casing.

Further, according to the present embodiment, the clutches 94 and 95 are interposed between the power transmission gear 91 and the front wheel drive shaft 92 so as to allow the front wheel drive shaft 92 to rotate faster than the power transmission gear 91. Accordingly, it is possible to effectively prevent the front wheels of a vehicle from wearing the ground when the vehicle makes a turn. This is caused by the differences in turning radius between the front and rear wheels. Also, it is possible to prevent the wear of the front wheels effectively.

More specifically, when the vehicle turns, the front and rear wheels on the same side rotate at different rotational speed due to the difference in turning radius. Accordingly, if the output shaft is connected to the front wheel drive shaft so that they rotate at the same speed, the front wheels slip when the vehicle turns, whereby the ground is worn or otherwise the front wheels are worn.

By contrast, according to the present embodiment, since the above-mentioned clutches are interposed between the power transmission gear 91 and the front wheel drive shaft 92 so as to allow the front wheel drive shaft 92 to rotate faster than the output haft 70, the front wheels can rotate faster than the rear wheels when the vehicle turns. Accordingly, the front wheels can be prevented from slipping during making a turn, thereby effectively preventing the ground wear or the wear of the front wheels.

Further, according to the present embodiment, since the front wheel drive unit 90 is disposed in the casing extension 4, it is unnecessary to design the width of the whole casing such as to accommodate the front wheel unit, thereby making the 4WD/2WD transmission compact.

Furthermore, since the input shaft 50 is arranged to one side in a width direction of the vehicle and the casing extension 4 is arranged to the other side in a width direction of the vehicle, the height of the transmission is not increased in spite of the provision of the front wheel drive unit 90. Thus, during the four wheel drive mode, the center of gravity of the vehicle is not located up the vehicle, whereby the running stability is not lowered. Further, since the front wheel drive shaft 92 is supported at its rear end by the extension rear wall 4e, it is possible to stably transmit drive power from the output shaft 70 to the front wheel drive shaft 92.

Embodiment 3

Figure 6:
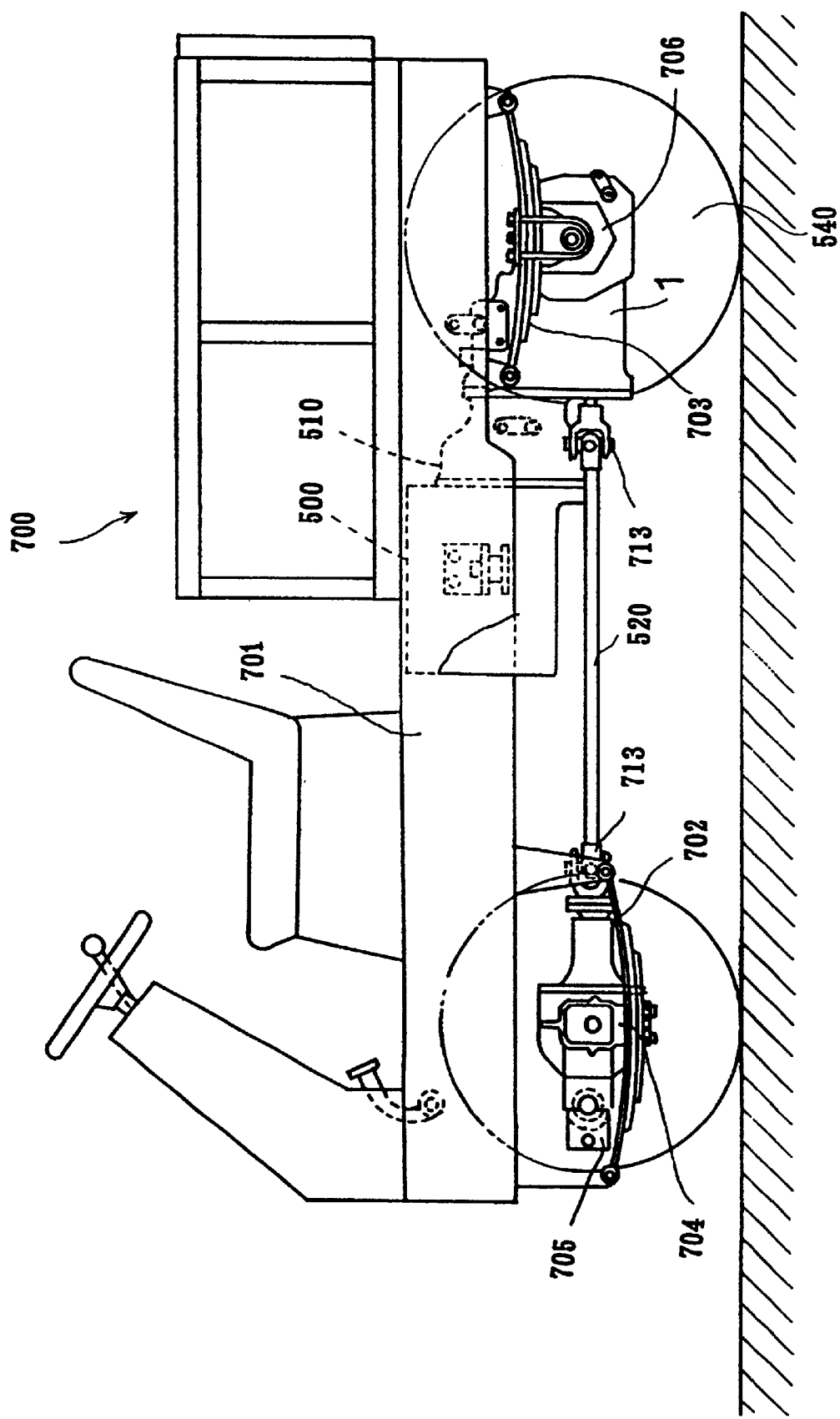
FIG. 6 is a schematic side view of the 4WD type vehicle in which transmission shown in FIG. 1 is mounted.

(1) Explained below with reference to FIGS. 1 and 6–19 is a first preferred embodiment for solving an problem in Prior Art 3. First, a four wheel drive type vehicle 700 will be explained with reference to FIG. 6, which vehicle comprises the transmission according to the present embodiment. In FIG. 6, the transmission of the present embodiment is denoted at 1. The vehicle 700 comprises a chassis 701 that carries a pair of front leaf springs 702 and a pair of rear leaf springs 703 at its front and rear portions, respectively.

Figure 7:
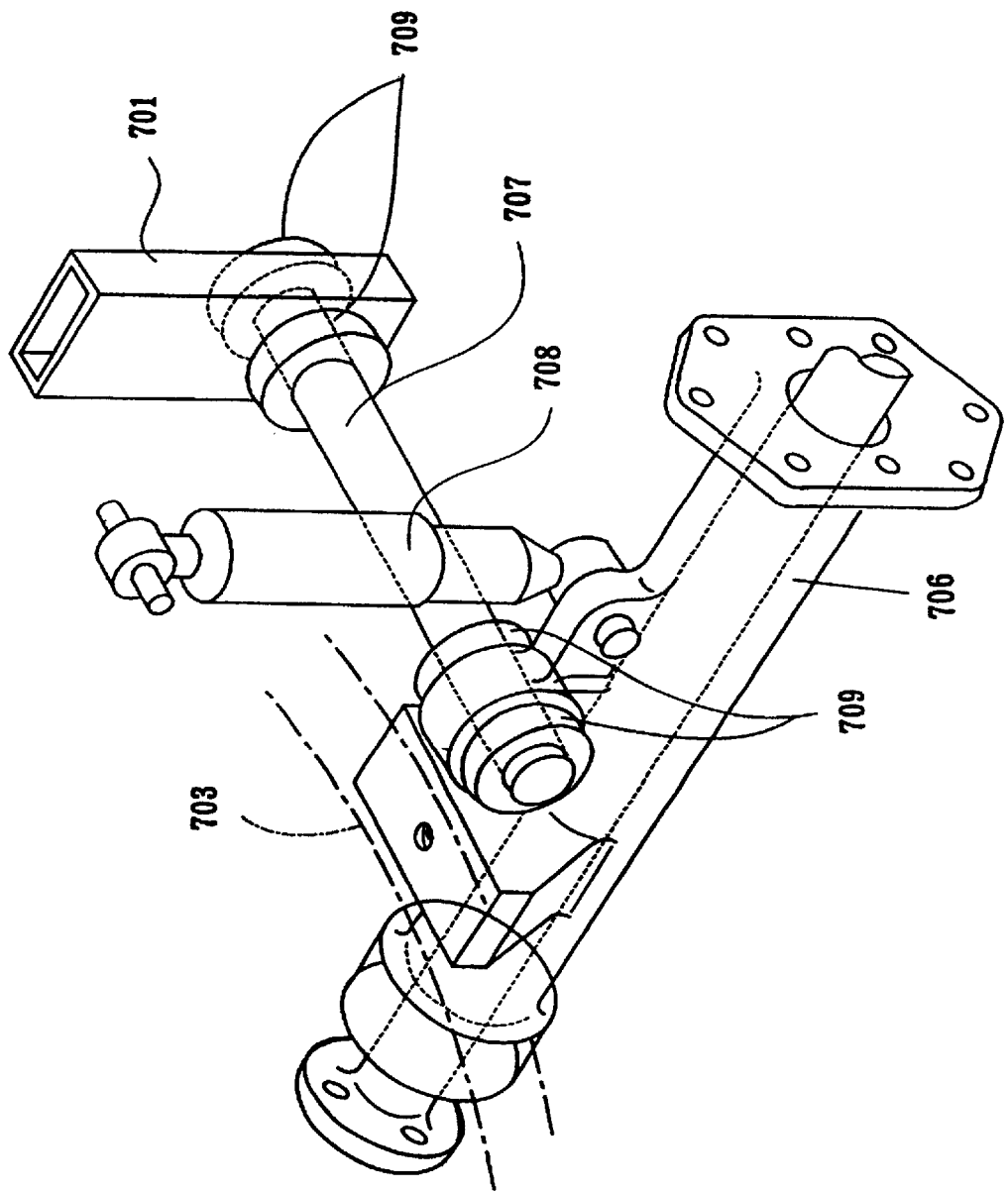
FIG. 7 is a perspective view showing a rear axle case being attached to a chassis in the vehicle shown in FIG. 6.

A front axle case 704 extending in a width direction of the vehicle is secured to the front leaf springs 702 by appropriate fastening means such as bolts. A cylinder of a power steering device 705 is mounted in front of the front axle case 704. On the other hand, a rear axle case 706 extending in a width direction of the vehicle is secured to the rear leaf springs 703 by appropriate fastening means such as U-bolts. Further, the rear axle case 706 is secured to the chassis 701 via a link member 707 as shown in FIG. 7 in order to prevent the rear axle case from moving in the longitudinal direction of the vehicle. Also, the rear axle case 706 is connected to the chassis 701 via a shock absorber 708 for absorbing the vertical oscillation of the rear axle case. In the figure, denoted at 709 is a mount rubber.

In front of the rear axle case 706, the transmission 1, the clutch housing 510 and the engine 500 are sequentially and directly connected in this order, along from the rear to the front of the vehicle. The engine 500 is swingably supported on the chassis 701 via a dumper, a spring or the like. The drive power for driving the front wheels is transmitted from the transmission 1 to the differential device housed in the front axle case via a propeller shaft 502 and a universal joint 713.

As described, with the rear axle case 706 being supported by the rear leaf springs 703, the transmission 1, a clutch housing 510 and the engine 500 are directly connected to each other in front of the rear axle case 706, and the engine 500 is swingably mounted on the chassis 701 so that the wheels 540, the rear axle case 706, the transmission 1, the clutch housing 510 and the engine 500 swing in a substantially integral manner relative to the chassis 701 during the vehicle traveling.

On the other hand, as disclosed in Japanese Unexamined Patent Publication No. 53929/1982, a differential housing, a transmission casing, and the engine are fixedly mounted on the chassis. Independently of these components, the wheels are carried by the chassis. This construction necessitates the provision of a constant velocity joint between a rear axle case and the transmission in order to absorb the difference in swinging between the former and the latter during the vehicle traveling. By contrast, according to the construction in which the leaf springs 703 hang the rear axle case 706, and that the rear axle case 706, the transmission 1, the clutch housing 510 and the engine 500 are connected to each other so as to swing integrally as described above, the difference in swing can be eliminated between the wheels and the engine, etc during vehicle traveling. Thereby, it can become unnecessary to use the constant velocity joint, thereby reducing the production cost.

Figure 8:
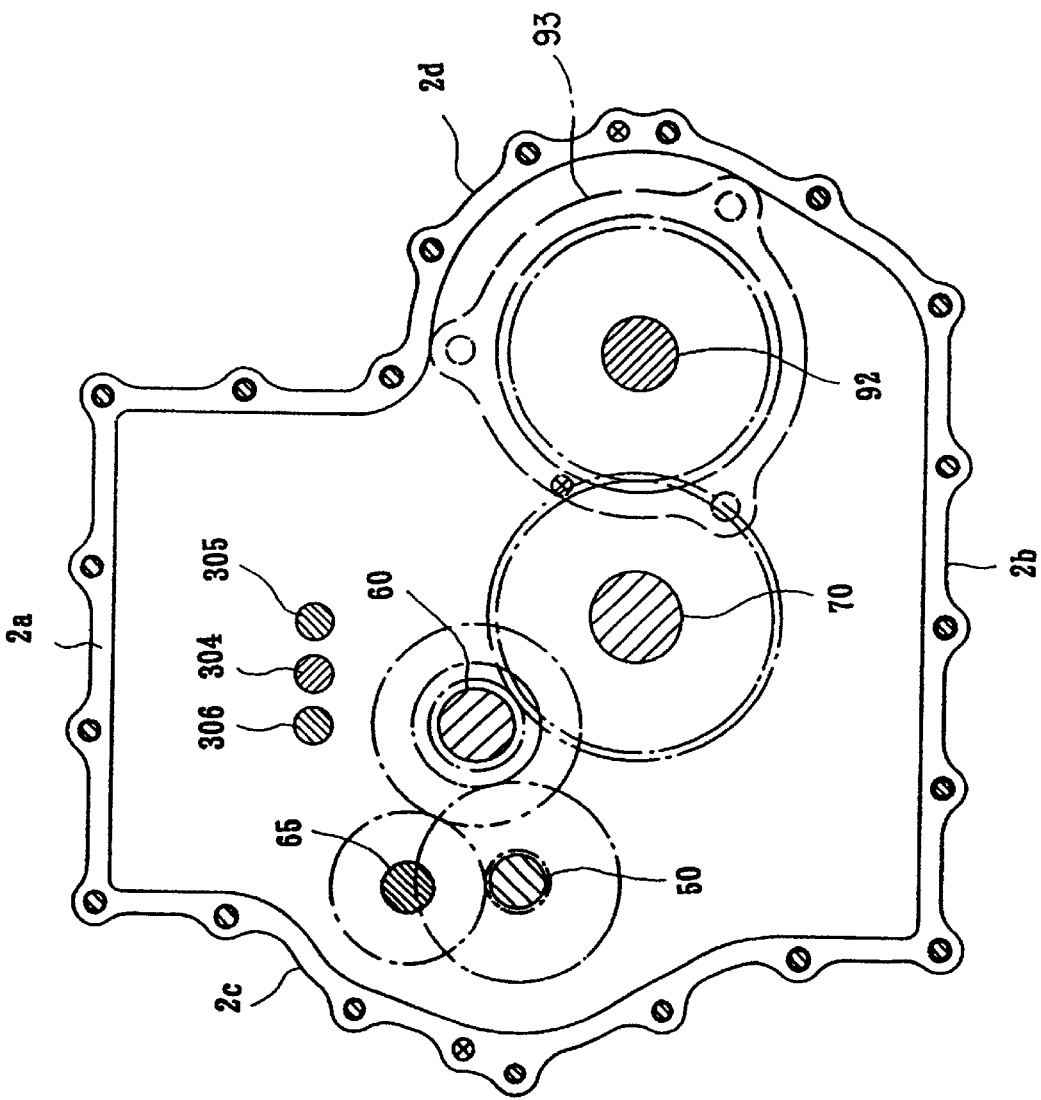
FIG. 8 is a cross section take along Line 8—8 of FIG. 1.
Figure 9:
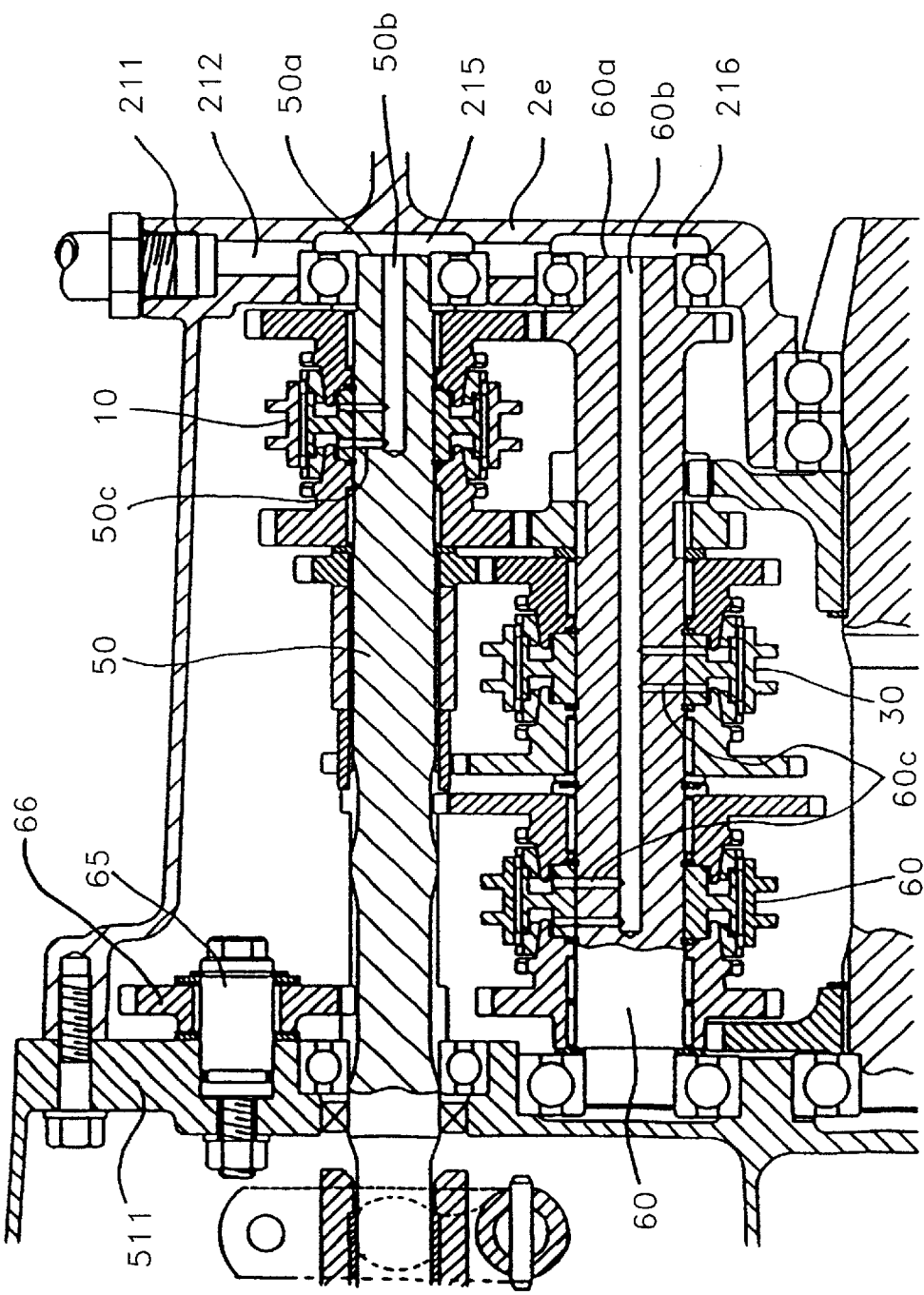
FIG. 9 is an enlarged view of the neighborhood of an input shaft and an intermediate shaft shown in FIG. 1.
Figure 10:
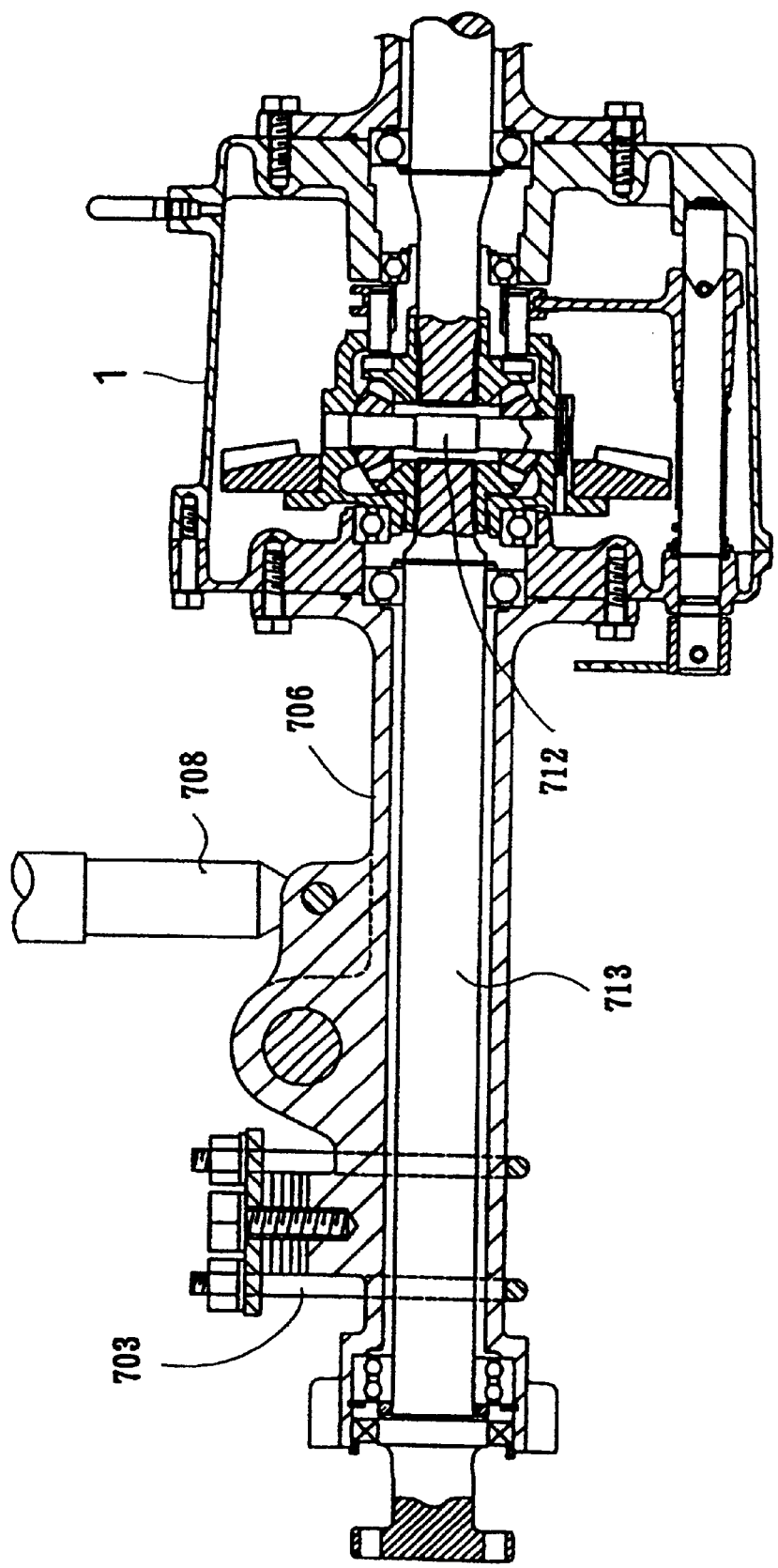
FIG. 10 is a cross section taken along Line 10—10 of FIG. 1.

Next, the transmission of the present embodiment will be explained. FIG. 1 is a plan cross section of the transmission, FIG. 8 is a cross section taken along Line 8—8 of FIG. 1, FIG. 9 is an enlarged view of the neighborhood of the input shaft and the intermediate shaft in FIG. 1, and FIG. 10 is a cross section taken along Line 10—10 of FIG. 1.

First, the entire construction of the rear wheel drive system will be explained. As shown in FIGS. 1 and 8, the transmission 1 comprises a casing 2 having an upper wall 2a, a lower wall 2b, right and left walls 2c and 2d, a rear wall 2e and an opening in its front. Integrally formed on the rear wall 2e is a differential device housing 2f extending rearwardly. Furthermore, the front opening of the transmission casing 2 is closed by the rear wall 511 of the clutch housing coupled to the transmission casing.

The transmission 1 comprises an input shaft 50 disposed longitudinally of the vehicle, the intermediate shaft 60 and the output shaft 70 that are disposed longitudinally of the vehicle, wherein these shafts are rotatably supported by the clutch housing rear wall 511 and the transmission casing rear wall 2e. Further, the transmission has a reversing idle shaft 65, which is supported by the clutch housing rear wall 511.

The input shaft 50 carries the 4th speed gear 11 and the 5th speed gear 12 in a rotatable manner. The synchromesh device 10 is fitted between the gears 11 and 12 so as to be axially slidable but relatively non-rotatable. The gears 11 and 12 mesh with gears 14 and 15 that are mounted on the intermediate shaft 60 non-rotatably relative thereto.

Further, the intermediate shaft 60 rotatably carries a reversing gear 22, a 2nd gear 31, and a 3rd gear 32. Synchromesh devices 20 and 30 are supported between the respective pairs of change speed gears so as to be axially slidable but non-rotatable relative to the intermediate shaft 60. The 1st speed gear 22, the 2nd speed gear 31, and the 3rd speed gear 32 mesh with gears 25, 34 and 35 mounted on the input shaft 50 non-rotatably relative thereto. Further, the reversing gear 21 is coupled to a gear 24 mounted on the input shaft 50 non-rotatably relative thereto, via an idle gear 66 rotatably mounted on a reversing idle shaft 65. Accordingly, the drive force of the input shaft 50 is transmitted to the intermediate shaft 60 according to the change gear ratio between the meshing gears by sliding one of the synchromesh devices 10, 20 and 30 in one axial direction. Further, a gear 81 mounted on the intermediate shaft 60 non-rotatably relative thereto meshes with a gear 82 mounted on the output shaft 70 non-rotatably relative thereto. The drive power is transmitted from the intermediate shaft 60 to the output shaft via the gears 81 and 82.

As described, it is possible to give the reversing rotation and the 5 step speed rotation to the output shaft 70 by sliding one of the synchromesh devices 10, 20 and 30 so as to select a change speed gear. The rotation of the output shaft 70 is transmitted to the rear axle 550 via a differential device 80 and to the front wheel drive shaft 92 via the power take off gear 71, the power transmission gear 91 and the bidirectional clutches 94 and 95.

Figure 11:
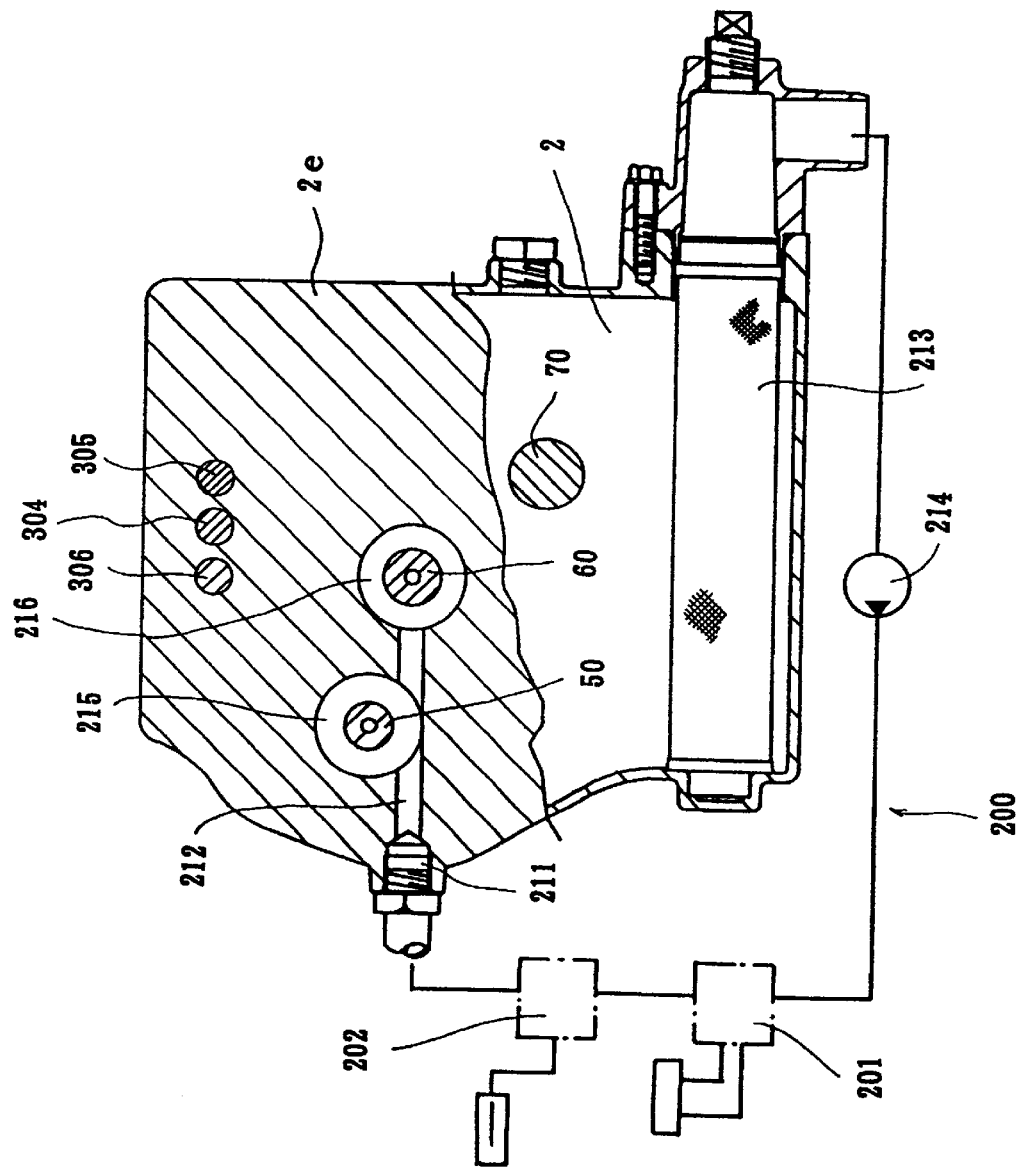
FIG. 11 is a cross section taken along Line 11—11 of FIG. 1.

Next, referring to FIGS. 9 and 11, explanation will be made of a lubricating oil supply circuit 200 to the thus constructed transmission. FIG. 11 is a cross section taken along Line 11—11 of FIG. 1. As shown in FIG. 11, the lubricating oil supply circuit 200 of the present vehicle comprises a power steering device hydraulic circuit 201 and a deck elevating device hydraulic circuit 202 connected to the hydraulic circuit 201 (hereinafter, these are referred to as "hydraulic circuit"), and is designed so as to introduce operating oil of the hydraulic circuit into the transmission casing 2 as a lubricating oil for the transmission.

The lubricating oil supply circuit 200 comprises an inlet 211 for introducing drain oil into the transmission casing 2 from the hydraulic circuit, an passage 212 for communicating the inlet 211 with the rear ends 50a and 60a of the input and intermediate shafts 50 and 60, supply passages 50b and 60b formed axially in the input and intermediate shafts from the rear ends 50a and 60a of the input and intermediate shafts, through holes 50c and 60c communicating the supply passages 50b and 60b with the outer surfaces of the input and intermediate shafts 50 and 60, a filter 213 provided below the transmission casing 2, and a pump 14 for sucking the oil stored in the transmission casing 2 via the filter 213 and circulating the sucked oil to the hydraulic circuit.

Pockets 215 and 216 are respectively formed in the rear wall portions that faces the bearing portions of the input and intermediate shafts, respectively. The inlet 211 and the passage 212 are formed in the transmission casing rear wall 2e such that the operating oil from the hydraulic circuit flows into the pockets 215 and 216. Further, the through holes 50c and 60c are formed at the positions corresponding to the respective synchromesh devices 10, 20 and 30. Accordingly, the operating oil flowed into the pockets 215 and 216 via the inlet 211 and the passage 212 flows to the contacting surface between the synchromesh devices and the change-speed gears, via the supply passages 50b and 60b and the through holes 50c and 60c formed in the input and intermediate shafts, and acts as lubricating oil. Thereafter, the lubricating oil flows downward in the transmission casing 2 and is stored there, and then is returned to the oil circuit after being purified with the filter 213 such as a strainer.

As described, the operating oil in the hydraulic circuit is also used as the lubricating oil for the change gear mechanism, and the transmission casing 2 is also used as the tank for the respective oil circuits. Accordingly, it is possible to eliminate the need for such a tank as required in the prior art, thereby reducing the production cost of the vehicle. Further, the present embodiment is designed such that oil can flow to the ends 50a and 60a of the input and intermediate shafts so as to be supplied to the respective synchromesh devices via the supply passages 50b and 60b, thereby efficiently supplying the lubricating oil to the respective change speed gears. Further, as shown in FIG. 11, the input shaft 50 and the intermediate shaft 60 are provided in the substantially same plane, and the pockets 215 and 216 are formed in the portions of the rear wall supporting the respective shaft ends, whereby it is possible to supply oil to the respective shaft ends with only one passage 212 being formed in the transmission casing rear wall 2e, thereby reducing the processing cost of the transmission casing.

Figure 12:
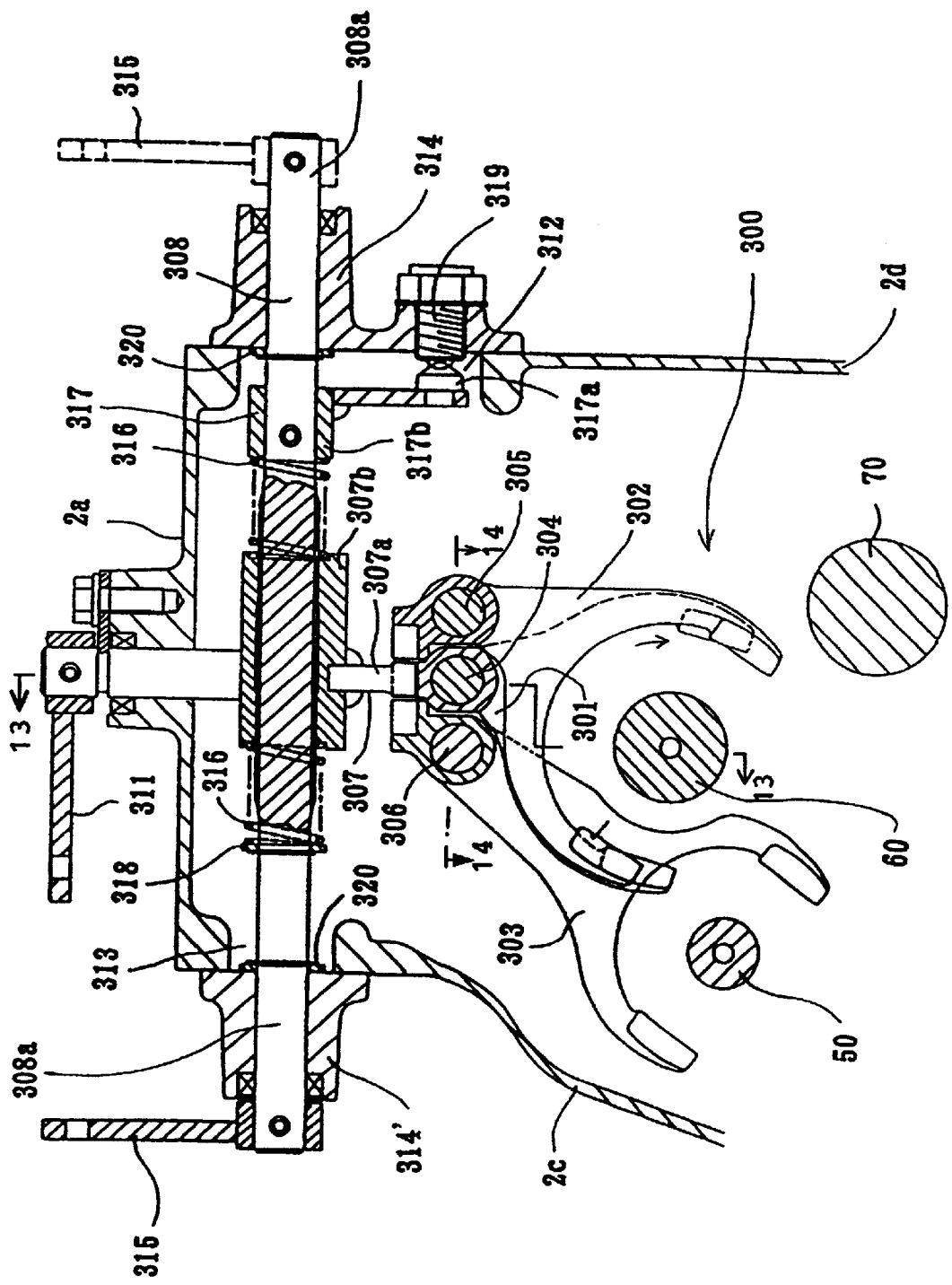
FIG. 12 is a transverse cross section of a change speed operating device of the transmission shown in FIG. 1.
Figure 13:
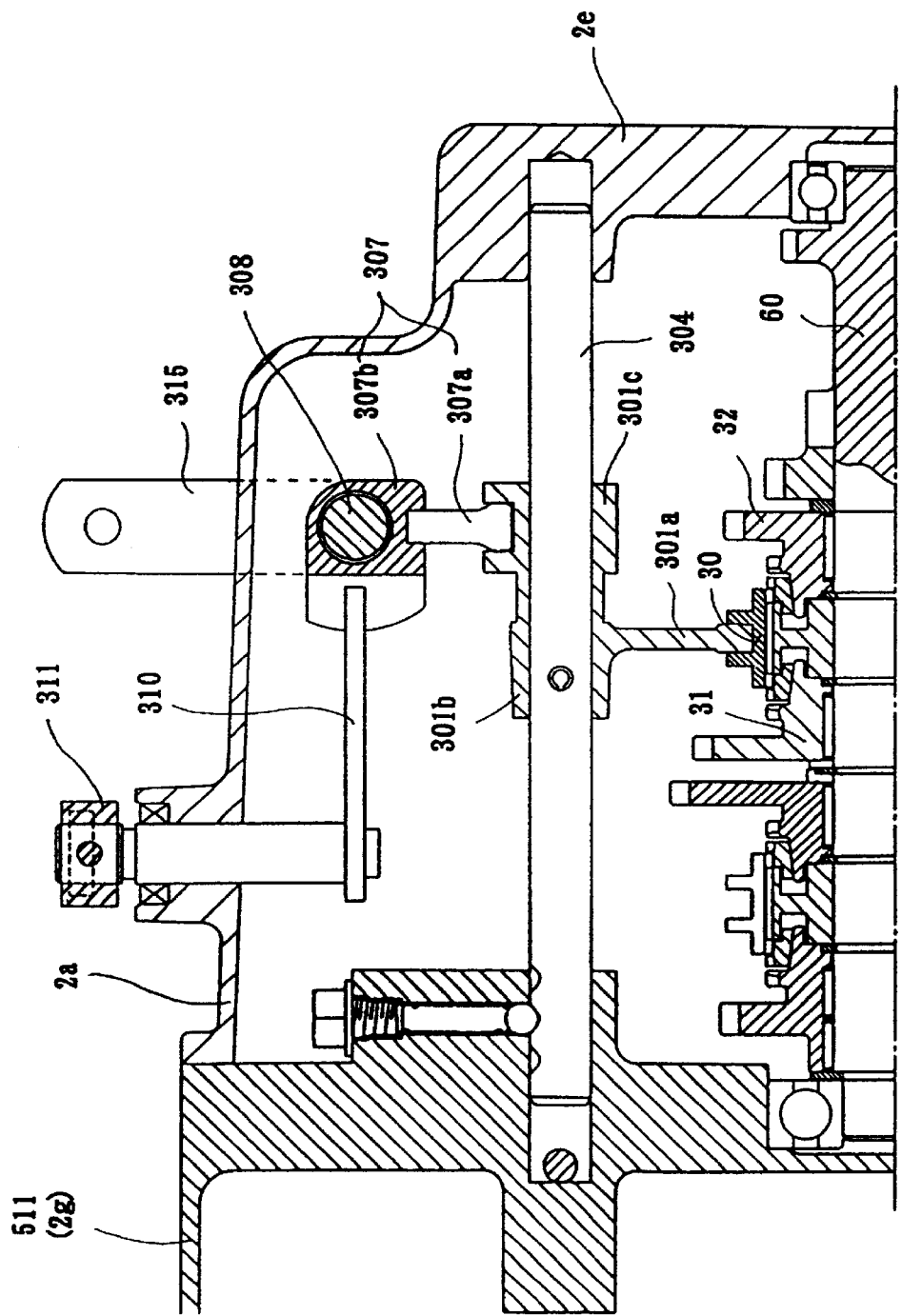
FIG. 13 is a cross section taken along Line 13—13 of FIG. 12.
Figure 14:
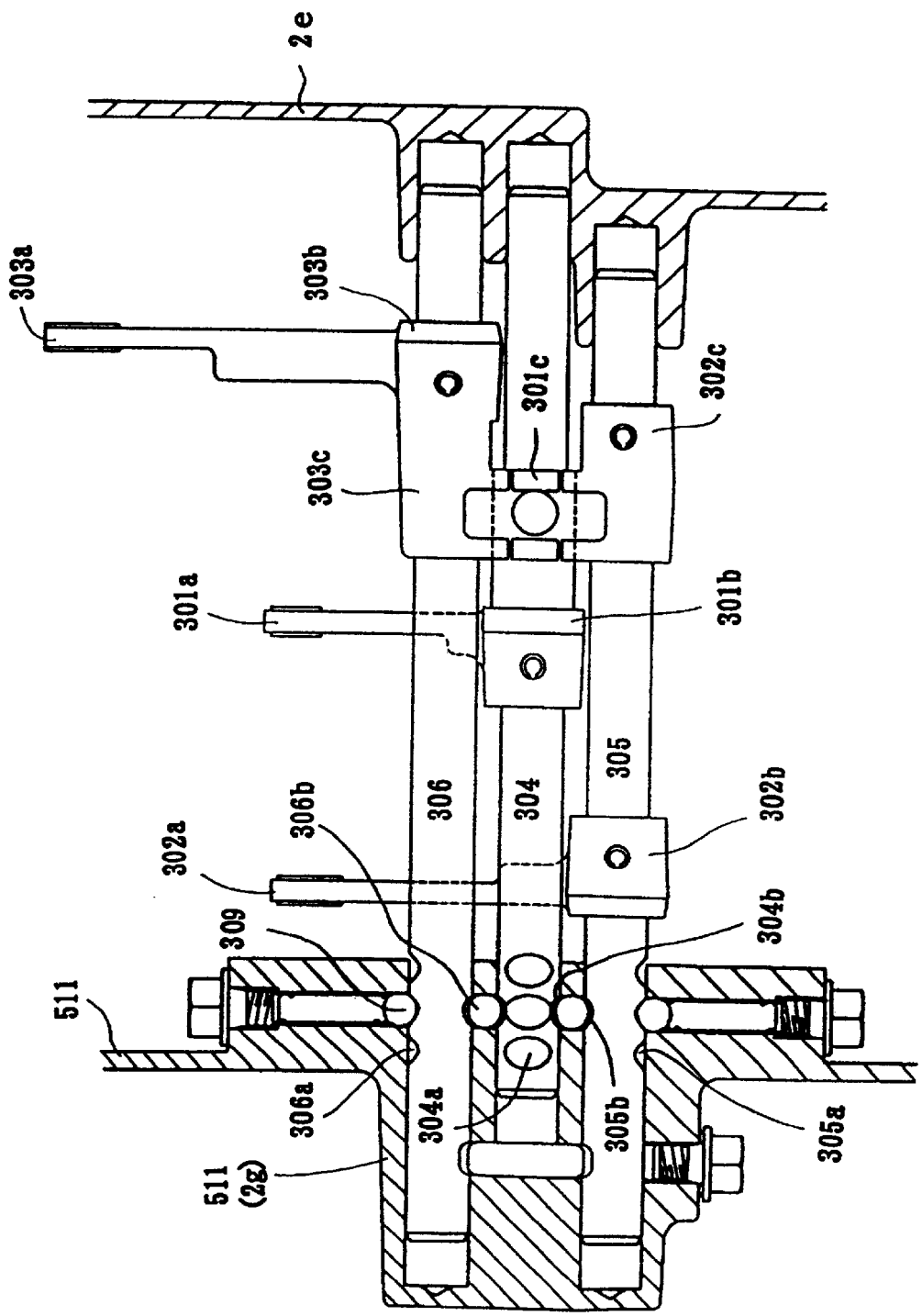
FIG. 14 is a cross section taken along Line 14—14 of FIG. 12.
Figure 15:
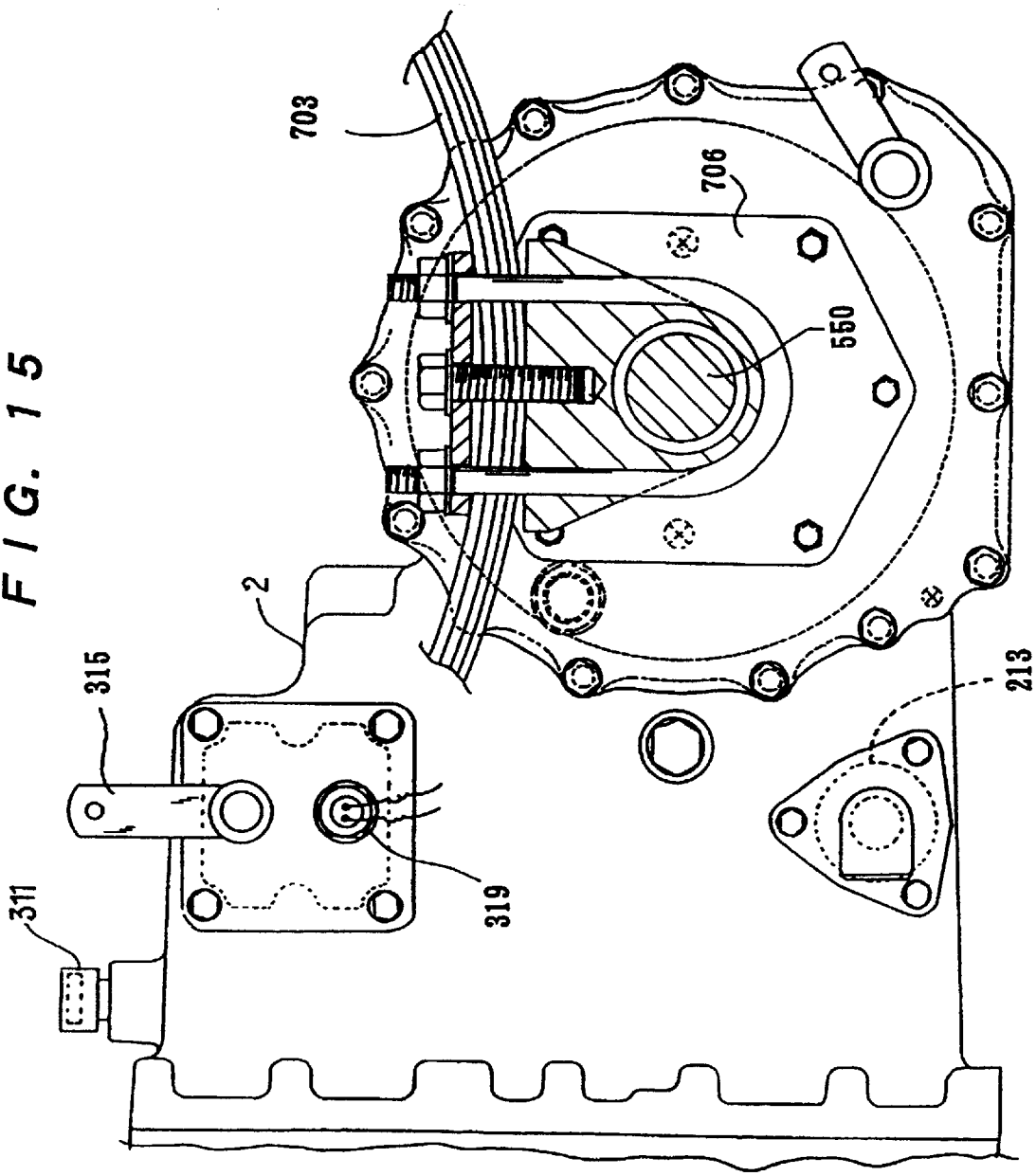
FIG. 15 is a view as seen from X of FIG. 1.

Referring to FIGS. 12–16, explained below is a change speed operating device 300 that operates the synchromesh devices. FIG. 12 is a transverse cross section of the change speed device 300 of the transmission shown in FIG. 1, FIG. 13 is a cross section taken along Line 13—13 of FIG. 12, FIG. 14 is a cross section taken along Line 14—14 of FIG. 12, and FIG. 15 is a view as seen from X of FIG. 1.

The change speed gear 300 comprises shift forks 301, 302 and 303 respectively engaging synchromesh devices 10, 20 and 30 at its end, fork shafts 304, 305 and 306 supporting the shift forks axially non-slidably and non-rotatably, a control member 307 engaging, at its end, one of receiving portions 301c, 302c and 303c of the shift forks, and a shift shaft 308 supporting the control member axially slidably but non-rotatably relative to the shift shaft 308.

The shift forks 301, 302 and 303 integrally comprise engaging portions 301a, 302a and 303a, base portions 301b, 302b and 303b and receiving portions 301c, 302c and 303c, respectively. The engaging portions are designed to engage the circumferential grooves of the synchromesh devices, and the base portions are fitted to the fork shafts in an axially non-slidable manner. According to the present embodiment, the base portions are formed integrally with the receiving portions. However, these portions may separately be formed and fitted to the fork shafts in an axially non-slidable manner.

As shown in FIGS. 13 and 14, the fork shafts 304, 305 and 306 are supported, by the transmission casing rear wall 2e and the clutch housing rear wall 511, longitudinally of the vehicle so as to be axially slidable but non-rotatable relative to the rear walls. The clutch housing rear wall 511 functions as a closing wall that closes at least a part of the front opening of the transmission casing 2. The fork shafts 304, 305 and 306 are provided, in at least one of the front or rear end portions, with ball grooves 304a, 305a and 306a corresponding to the neutral position and the respective change speed positions of the synchromesh devices. Locking balls urged by springs engage the ball grooves, respectively. Still further, the respective fork shafts are provided with ball grooves 304b, 305b and 306b for preventing double meshing, and locking balls received therein.

According to the present embodiment, the fork shafts are supported in an axially slidable manner, and the shift fork is fitted to the fork shafts non-slidably relative thereto, so that the shift forks can slide longitudinally of the vehicle together with the fork shafts. It is also possible that the fork shafts be supported in an axially non-slidable manner, and the shift forks be fitted to the shift forks in an axially slidable manner, so that the shift fork can slide longitudinally of the vehicle.

The control member 307 comprises an arm 307a for engaging one of the receiving portions 301c, 302c and 303c of the shift forks and a slider 307b supporting the base portion of the arm. The slider 307b is fitted to the shift shaft 308 so as to be axially slidable but non-rotatable relative thereto. Further, the slider 307b is coupled via a link member 310 to a select lever 311 that is supported by the upper wall 2a of the transmission casing in a horizontally pivotal manner. As the select lever 311 horizontally pivots, the control member 307 slides axially of the shift shaft 308.

As best viewed in FIG. 12, the shift shaft 308 is supported above and orthogonal to the fork shafts 304, 305 and 306 by opposing side walls 2c and 2d of the transmission casing. According to the present embodiment, the shift shaft 308 is pivotally supported by bearing members 314 and 314' that close openings 312 and 313 formed in the side walls 2c and 2d. It is preferable that the opening width of at least one opening 312 of the said openings is larger than the maximum width of the control member 307. Thus, the arm 307a of the control member can engage the receiving portions 301c, 302c and 303c of the shift forks, with the control member 307 being attached to the shift shaft 308, thereby improving the assembling efficiency of the transmission. The shift shaft 308 extends outwardly in opposite directions beyond the bearing members 314, 314'. The shift lever 315 can be attached non-pivotally at either extension 308a, 308a. With this construction, it is possible to improve the design freedom of the linkage of the change speed lever provided beside the driver's seat.

The shift shaft 308 has a pair of coil springs 316, 316 of an equal biasing force, which springs are located on the opposite sides of the slider 307b of the control member, respectively. Further, the shift shaft 308 has a neutral position detecting member 317 and a positioning ring 318 on the outsides of the pair of springs 316, 316, which members are fitted so as to be axially non-slidable and non-rotatable relative to the shift shaft. The neutral position detecting member 317 is designed such that when the control member 307 is located at the neutral position, the end 317a of the neutral position detecting member contacts a neutral position detecting switch 319 that is provided on the bearing member 314 (see FIGS. 12 and 15). Further, the base portion 317b of the neutral position detecting member has an inner end which functions as an outside positioning member for positioning the outside ends of the pair of coil springs 316, 316, together with the positioning ring 318.

The pair of coil springs 316, 316 produce a resistance feeling (response feeling) in cooperation with the outside positioning member during the control arm slides, and also function as biasing members for returning the control arm 307 to the neutral position accurately. More specifically, when the control arm 307 is slid from the neutral position where it engages the 2nd and 3rd speed shift fork 301 in either axial direction along the shift shaft, the compressed coil springs bias the control arm toward the neutral position. At this time, since the biasing forces of the pair of coil springs 316, 316 are equal, the control arm 307 is accurately returned to the neutral position so long as no external force is applied thereto. In the figures, the reference numeral 320 denotes a ring for preventing the slipping-off of the shift shaft 308, which ring is fitted to the shift shaft 308 in an axially non-slidable manner.

The select lever 311 and the shift lever 315 are coupled, via a cable, to a change speed lever attached aside of the driver's seat. Accordingly, when the change speed lever is shifted from the neutral position to the reversing–1st speed column or to the 4th speed–5th speed column shown in FIG. 16, the select lever 311 is correspondingly pivoted such that the control arm 307 is slid from the neutral position, i.e., from the position for engaging the 2nd and 3rd speed shift fork 301 to the position for engaging the reversing and 1st speed shift fork 302 or the 4th and 5th speed shift fork 303. Further, the change speed lever is shifted between the upper row, i.e., the reversing–2nd–4th speed row and the lower row, i.e., the 1st–3rd–5th row, the shift lever 315 is correspondingly pivoted such that the respective synchromesh devices is slid from its neutral position to the meshing position for meshing one of the change speed gears.

The internal operation of the thus constructed change speed operating device 300 will be explained below. When the drive power from the engine 500 is shut off by pressing a clutch pedal and the speed change lever is shifted to the reversing–1st speed row, the select lever is pivoted in association therewith so as to slide the control member 307 from the neutral position toward the reversing–1st speed shift fork 302, against the spring force of the spring coil 316. When the change speed lever is shifted to the 1st speed position, the shift lever 315 is pivoted in association therewith to rotate the shift shaft 308. As described above, since the slider 307b of the control member is supported on the shift shaft 308 non-rotatably relative thereto, the control member 307 swings with the rotation of the shift shaft 308 so that the associated fork shaft 305 slides axially via the receiving portion 302c of the fork engaging the control member 307. The engaging portion 302a of the shift fork slides the synchromesh device 20 toward the 1st speed gear 22 with the sliding of the fork shaft 305 so as to couple the synchromesh device 20 with the 1st speed gear 22. Thereafter, when the clutch is engaged, the drive power transmitted from the engine 500 to the input shaft 50 is transmitted to the intermediate shaft 60 via the gear 25, the 1st speed gear 22 and the synchromesh device 20 on the input shaft. The drive power is transmitted to the output shaft 70 via gears 81 and 82 so that the rear axle 550 is driven via the differential gear device 80.

On the other hand, when the change speed lever is shifted so as to return the reversing–1st speed synchromesh device 20 to the neutral position, the control arm 307 is automatically and accurately returned to the neutral position because of the biasing force of the coil springs 316, 316.

Thus, the present embodiment has the following features that: i) the employed transmission 2 is opened only at its front, ii) the fork shafts 304, 305 and 306 supporting the shift forks 301, 302 and 303 are supported by a) the closing wall 511 closing the front opening of the transmission casing and b) the rear wall 2e of the transmission casing, and iii) the shift shaft 308 supporting the control member 307 is supported by the opposing side walls 2c and 2d of the transmission casing, whereby it is possible to eliminate the need for a plate that closes the upper opening of the transmission casing and supports the shift shaft and the like, reducing the number of parts and therefore reducing the production cost.

Further, according to the present embodiment, it is possible to improve the assembling efficiency of the change speed operating device. That is, according to the conventional change speed operating device in which a plate attached on the transmission casing supports the shift shaft, it is necessary that the plate is fixedly attached on the transmission casing with the arm of the control member supported by the plate being engaged with the receiving portion of the shift fork. Therefore, the assembling of the conventional change speed operating device is inefficient. Further, with this conventional construction, since it is impossible to detach only the shift shaft, inconveniences are caused in maintenance.

By contrast, according to the present embodiment, the shift shaft 308 is supported by the side walls 2c and 2d of the transmission casing without using a closing plate, whereby the control member 307 and the shift shaft 308 can be attached and detached independently. Therefore, it is possible to improve the assembling efficiency of the change speed operating device and the working efficiency in a maintenance.

Furthermore, according to the present embodiment, the width of at least one of the openings formed in the transmission casing side walls 2c and 2d is larger than the maximum width of the control member 307. Accordingly, the control member 307 can engage the shift forks 301, 302 and 303 with the control member 307 being supported by the shift shaft 308, thereby further improving the assembling efficiency.

Further, since the shift shaft 308 is provided with the pair of coil springs 316, 316 that exert an equal biasing force as the biasing member for biasing the control arm to the neutral position, the operator can feel a resistance when shifting the change speed lever and also the control member 307 can be returned to the neutral position accurately.

(2) A variant embodiment of the transmission of Embodiment 3 will be explained below with reference to FIGS.

17–19. In lieu of the pair of coil springs 316, 316, the transmission of the present variant embodiment employs coil springs 351 and 352 having different biasing forces, thereby preventing the operation mistakes during the change speed operation. The same or similar components as in Embodiment 3 are denoted with the same reference numerals, and the explanations therefor are omitted.

The transmission of the present variant embodiment has the biasing member, for biasing the control arm to the neutral position, which comprises i) a first coil spring 351 that is compressed when the control member 307 is engaged with the shift fork 302 for the reversing–1st speed gear and ii) a second coil spring 352 that is compressed when the control member 307 is engaged with the shift fork 303 for the 4th–5th speed gear. The biasing force of the first coil spring 351 is stronger than that of the second coil spring 352. Thus, since the first spring 351 and the second spring 352 are made unequal in biasing force, the operator can feel different responses between when shifting the change speed lever from the neutral position to the reversing–1st speed row and when shifting the change speed lever to the 4th–5th speed row, whereby it is possible to prevent the mis-operation during the change speed operation.

If the coil springs having different biasing forces are fitted on the same shift shaft 303 as used in Embodiment 3, the control arm 307 is slid to compress the spring of the weaker biasing force, in other words the control arm 307 is not located at the exact neutral position. By contrast, the present variant embodiment is constructed as follows, thereby preventing this disadvantage.

That is, the present variant embodiment employs i) a shift shaft 353 having a large diameter portion 353a on its axially central portion, which portion 353a is raised from the other portion of the shaft with shoulders and ii) a pair of slidable rings 354, 354 that are slidably and rotatably fitted to the shift shaft 353 on the opposite sides of the large diameter portion 353a so as to prevent the above disadvantage. Other components are similar to those of Embodiment 3.

Figure 18:
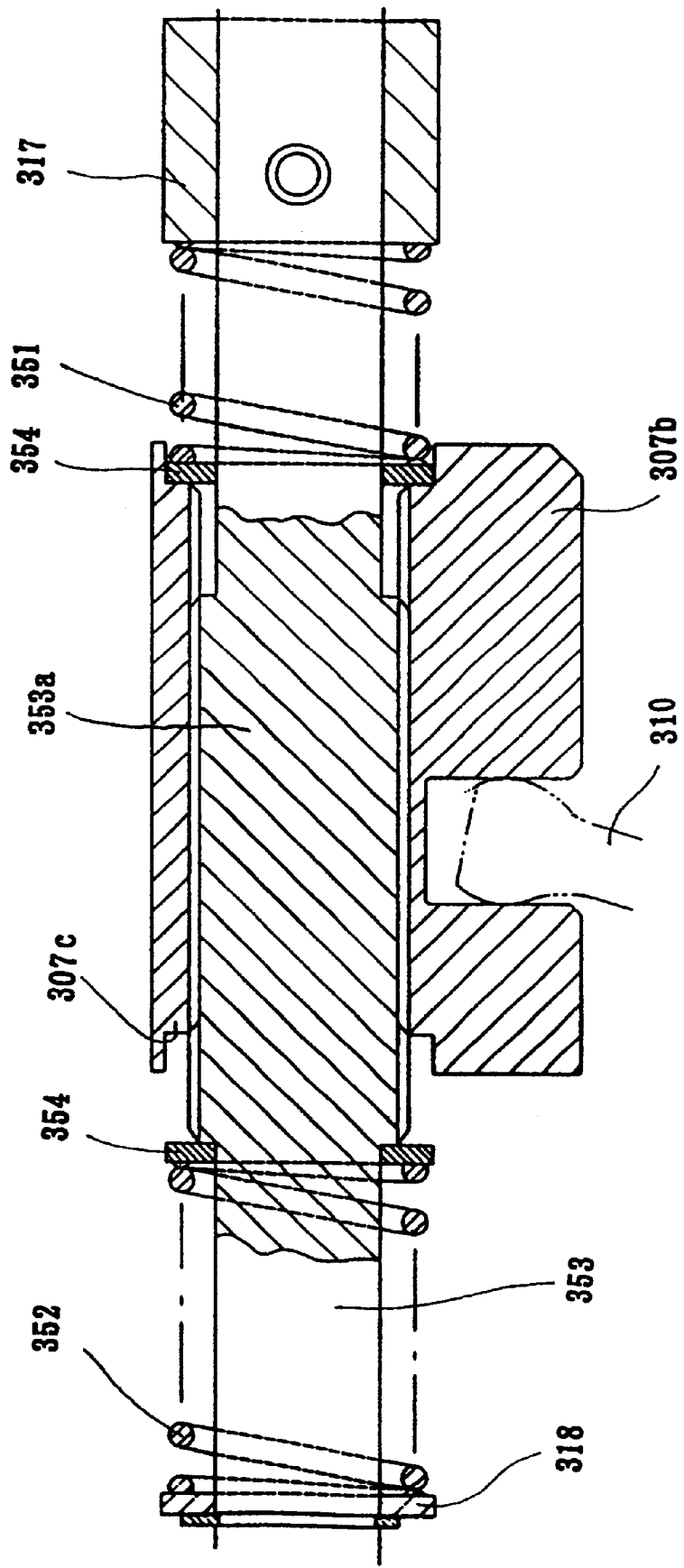
FIG. 18 is a longitudinal cross section showing that the control member shown in FIG. 17 is in a shifting position.
Figure 19:
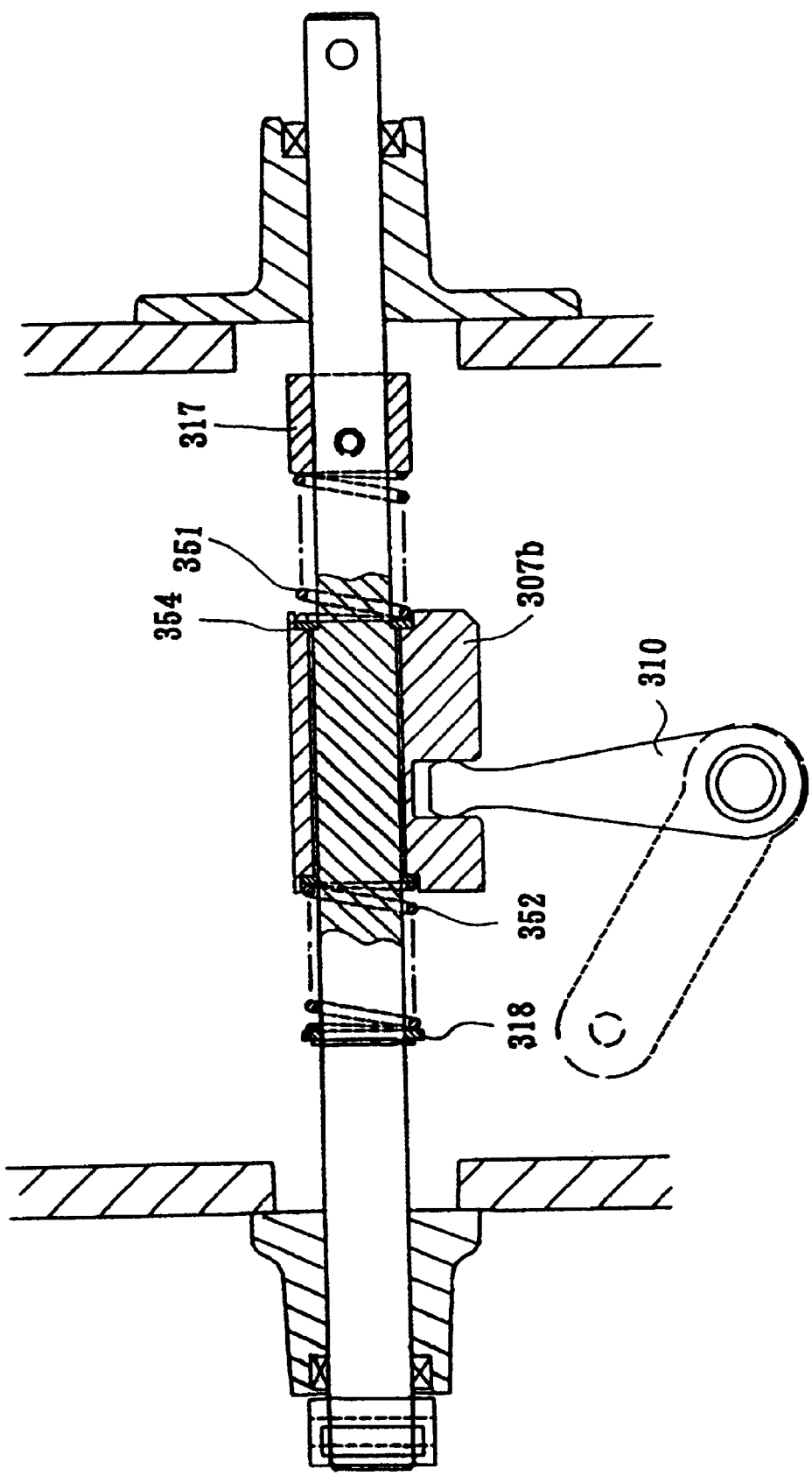
FIG. 19 is a longitudinal cross section showing another embodiment of the shift shaft shown in FIG. 17.

As well viewed in FIG. 18, the sliding portion 307b of the control member contacts the large diameter portion 353a of the shift shaft at a contact portion 307b. The length of the contact portion 307c is equal to the axial length of the large diameter portion 353a. In the present variant embodiment, the sliding portion 307b has annular recesses formed in the opposite ends. In this construction, the length between the bottom of one recess and the bottom of the other recess is equal to the length of the contact portion 307c.

Slidable rings 354 are fitted to the shift shaft 353 in an axially slidable manner between the outsides of the large diameter portion 353a and the insides of the coil springs 351, 352. The slidable springs 354 have an inside diameter smaller than the outside diameter of the large diameter portion 353a and have an outside diameter larger than the outside diameter of the large diameter portion 353a, such that the inside ends contact both the shift shaft shoulders and the recess bottoms of the sliding portions 307b. The first coil spring is maintained between the neutral position detecting member 317 and one of the slidable rings 354, and the second coil spring 352 is maintained between the positioning ring 318 and the other of the slidable rings 354 so as to urge the corresponding slidable rings to the shift shaft shoulders.

Figure 17:
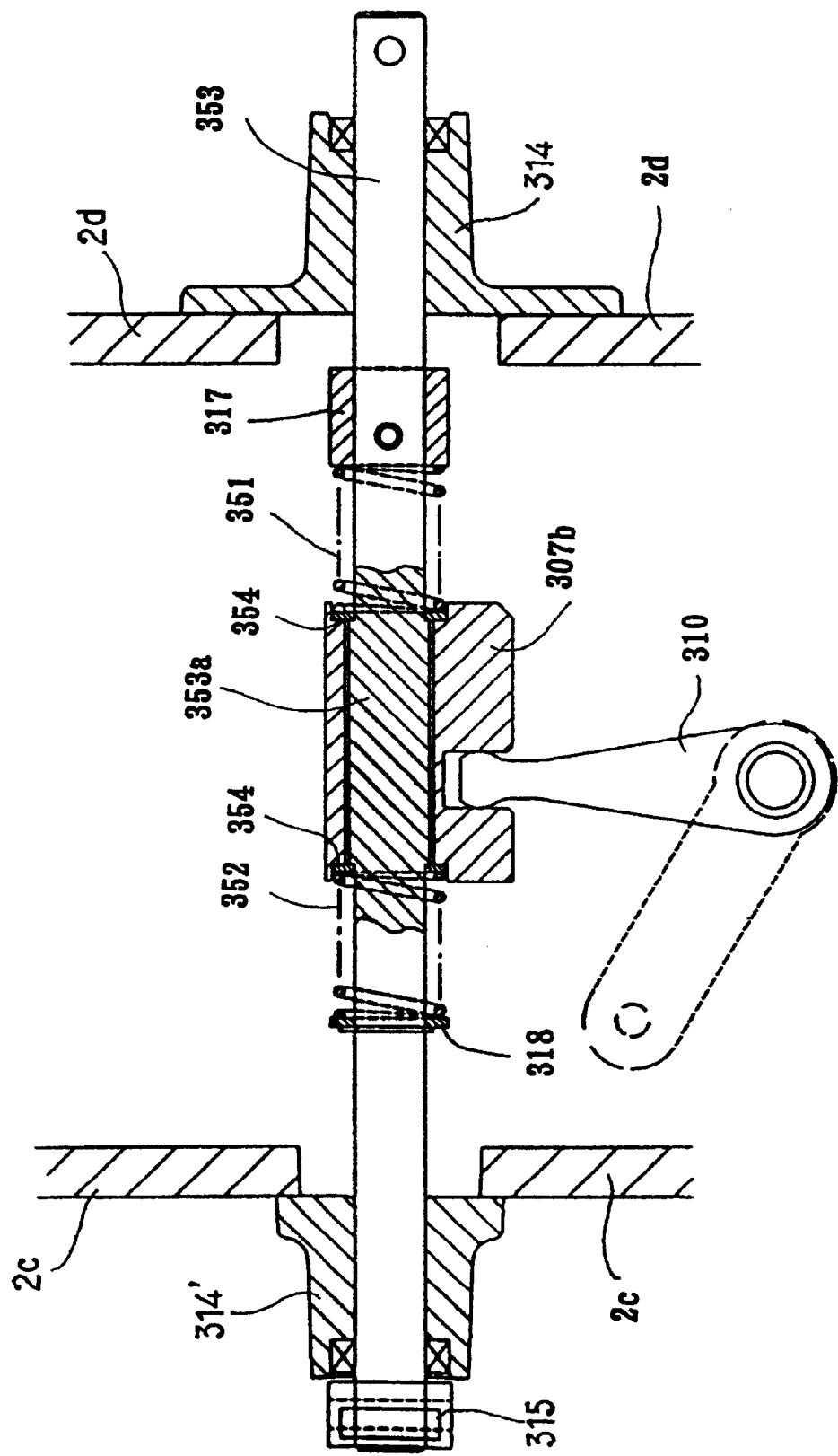
FIG. 17 is a longitudinal cross section showing the neutral position of a control member of a variant embodiment of the change speed operating device shown in FIG. 12.

The thus constructed change speed operating device of this variant transmission will be explained below. When the control member 307 is out of operation, each of the pair of coil springs 351, 352 presses the control member 307 axially inwardly of the shift shaft 353 via the slidable ring 354, so that the control member 307 is maintained at the positions where both the rotatable rings 354, 354 contact the shoulders of the shift shaft 353 as shown in FIG. 17, i.e., at the neutral positions. On the other hand, when the control member 307 is slid so as to compress the first coil spring 351 as shown in FIG. 18, the biasing force of the first coil spring 351 is applied on the control member 307, whereby the resistance force is generated according to the amount of the biasing force. At this time, the slidable ring 354 pressed by the second coil spring 352 contacts the shoulder of the shift shaft 353 and therefore cannot slide any longer. Accordingly, the second coil spring 352 does not affect the control member 307. Similarly, when the control member 307 is slid so as to compress the second coil spring 352, a resistance force is generated according to the amount of the biasing force of the second coil spring 352.

Thus, the present variant embodiment can generate different resistance corresponding to the sliding direction of the control member 307, i.e., the shifting direction of the shift lever. Accordingly, in addition to the advantages of Embodiment 3, the present variant embodiment has the advantage of preventing the mis-operation during changing speed.

In the present variant of the Embodiment 3, the large diameter portion is formed on the central portion of the shift shaft, both the pair of coil springs contact the shoulders of the shift shaft such that the control member is accurately returned to the central position whichever side the coil spring of the stronger biasing force is located. However, even in the case of using the shift shaft having a shoulder on the side where the coil spring of the stronger biasing force is located, the same advantage with that of the present variant can be obtained.

Embodiment 4

Figure 20:
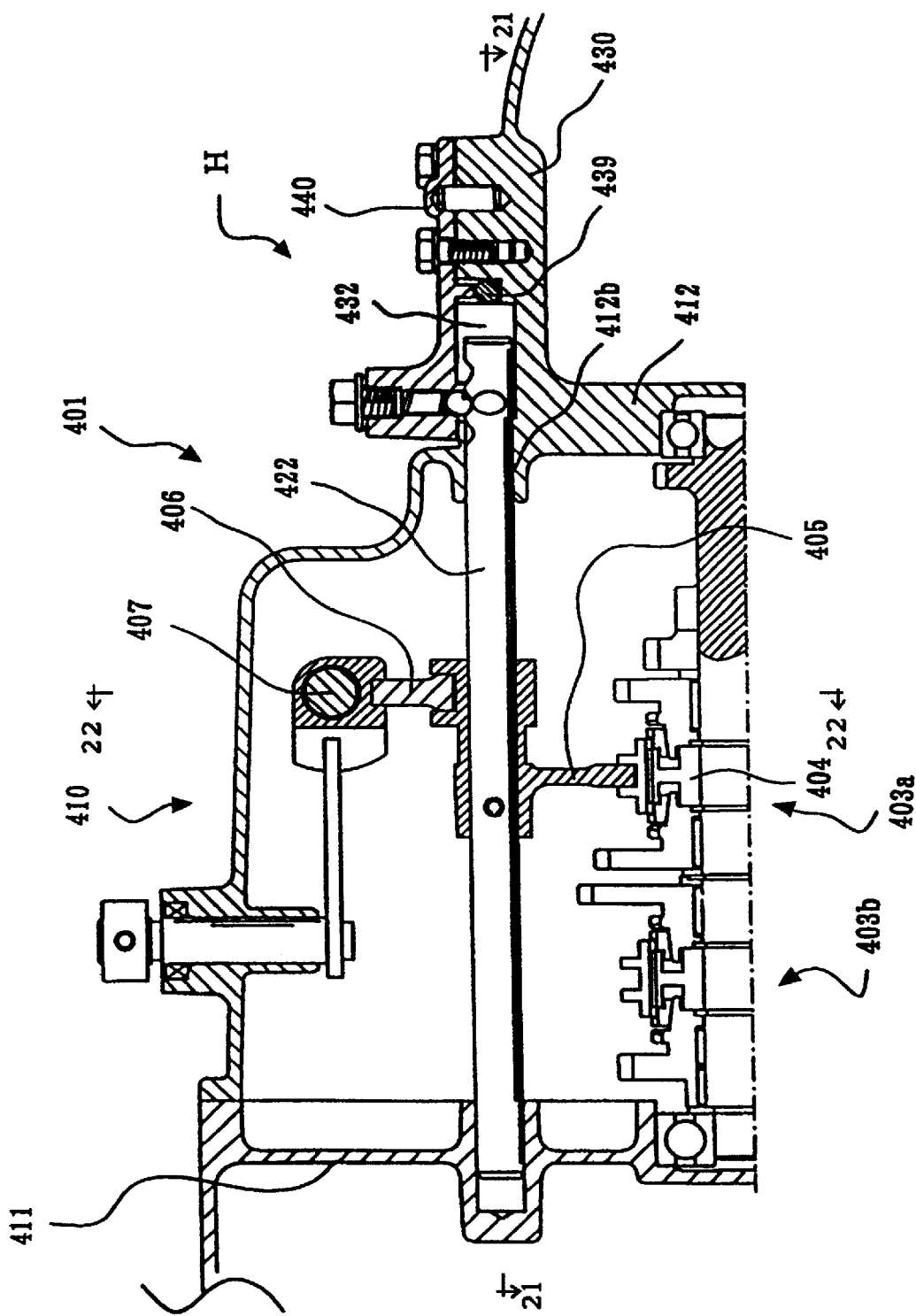
FIG. 20 is a longitudinal cross section of the transmission according to Embodiment 4.

With reference to the accompanying drawings explained below will be a preferred embodiment for solving disadvantage in the Prior Art 4. FIG. 20 is a vertical cross section of the transmission of the present embodiment, and FIGS. 21 and 22 are cross sections taken along Line 21—21 and Line 22—22 of FIG. 20, respectively.

Figure 21:
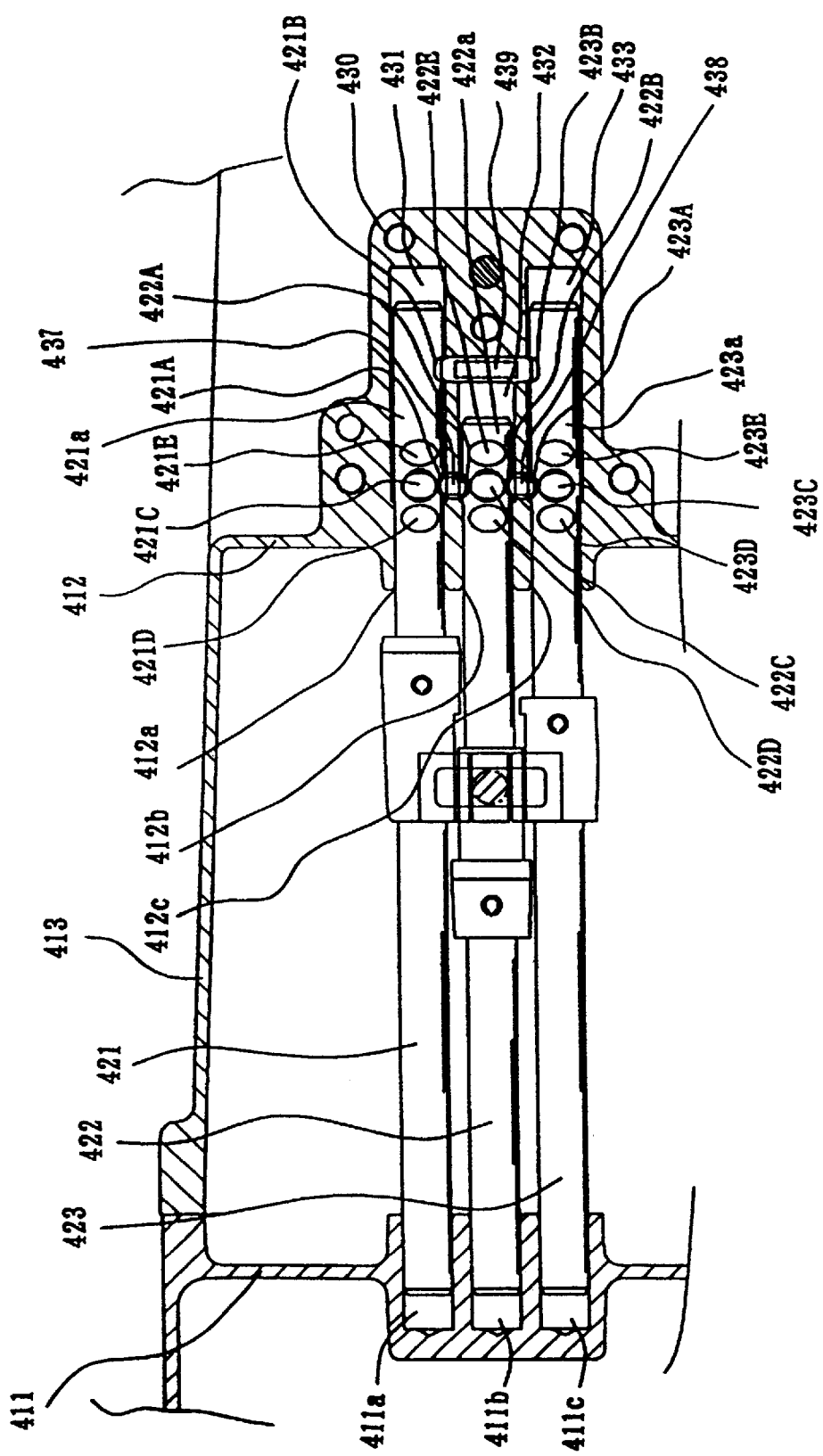
FIG. 21 is a cross section taken along Line 21—21 of FIG. 20.
Figure 22:
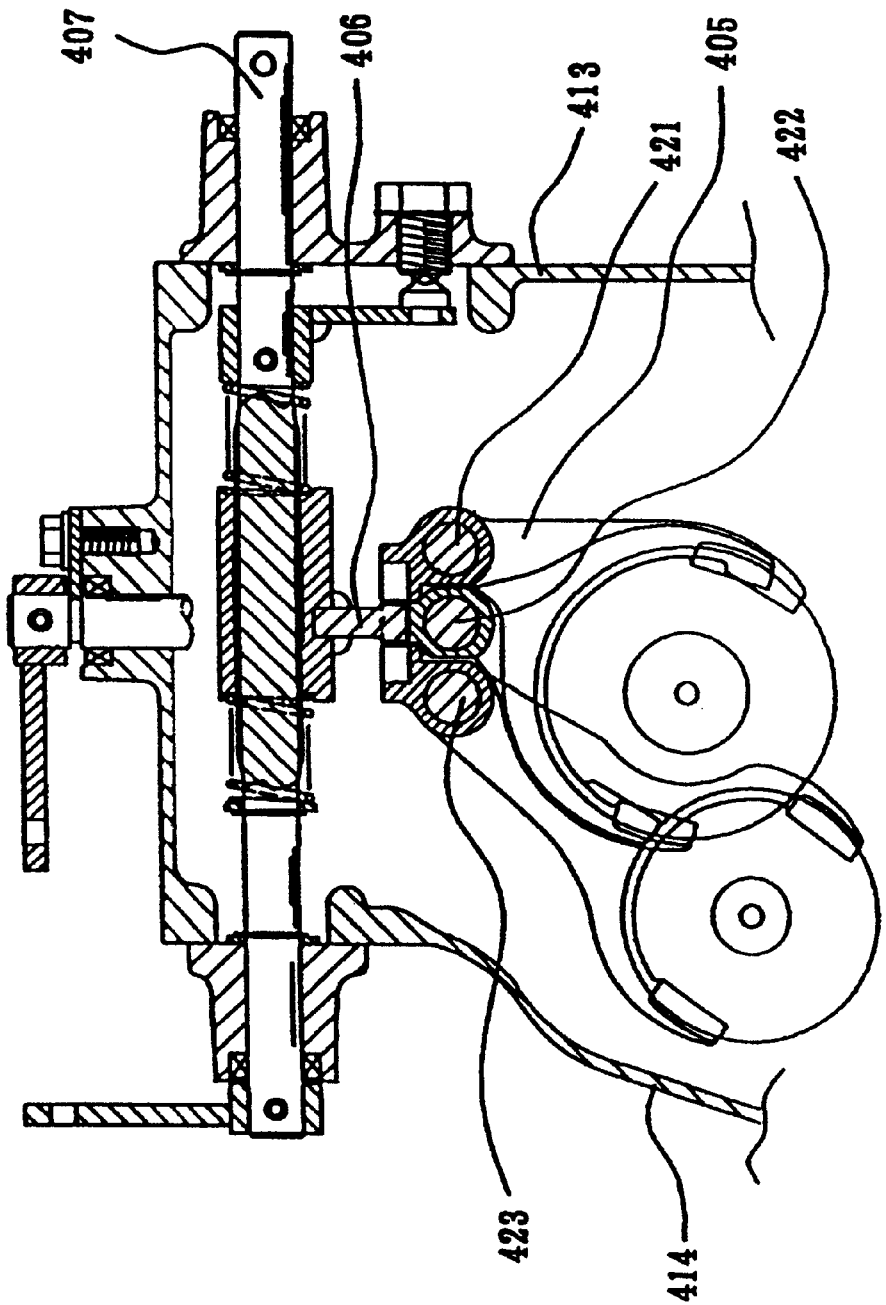
FIG. 22 is a cross section taken along Line 22—22 of FIG. 20.

As shown in FIGS. 20–22, the transmission 401 of the present embodiment comprises a casing 410, a cover 440 detachably attached to the casing, a gear type change speed mechanism 403, a shift fork 405 to engage a synchromesh device 404 of the gear type change speed mechanism, fork shafts 420, 421 and 422 supporting the shift fork in an axially non-slidable manner, a control member 406 for sliding the fork shaft axially, and a shift shaft 407 supporting the control member.

The transmission of the present embodiment comprises three gear type speed change mechanisms, each including i) a pair of change speed gear trains having different change gear ratios and ii) the synchromesh device 404 for selecting one of the pair of change speed gear trains. In FIG. 20, two of the three gear type speed change mechanisms are denoted at 403a and 403b. The transmission further comprises three fork shafts 421, 422 and 423 corresponding to the respective gear type change speed mechanisms (see FIG. 21).

The said casing comprises i) front and rear walls 411 and 412 which stand substantially vertically and are opposing to each other and ii) left and right side walls 413 and 414. According to the present embodiment, the clutch housing rear wall also forms the casing front wall 411.

As well viewed in FIG. 21, the casing front and rear walls 411 and 412 are provided with first, second and third shaft holes 411a, 411b, 411c and 412a, 412b, 412c supporting the front and rear ends of the first, second and third fork shafts 421, 422 and 423, respectively. The respective fork shafts are supported by the shaft holes in an axially slidable manner. Further, the transmission casing rear wall 412 is provided with an extension 430 extending outwardly from below the shaft holes 412a, 412b and 412c.

The extension 430 is provided with housing grooves 431, 432 and 433 that communicate with the shaft holes 412a, 412b and 412c, respectively. The first, second and third shafts have projections 421a, 422a and 423a that project outwardly beyond the each shaft holes, respectively. The projections 421a, 422a and 423a are housed within the housing grooves 431, 432 and 433, respectively. According to the present embodiment, the fork shafts 421, 422 and 423 are supported longitudinally of the vehicle by the casing front and rear walls 411 and 412, and the extension 430 is formed on the casing rear wall 412. Instead of this construction, it is also possible to support the fork shafts with the opposing side walls 413 and 414 and to form a corresponding extension on either of the side walls.

Figure 23:
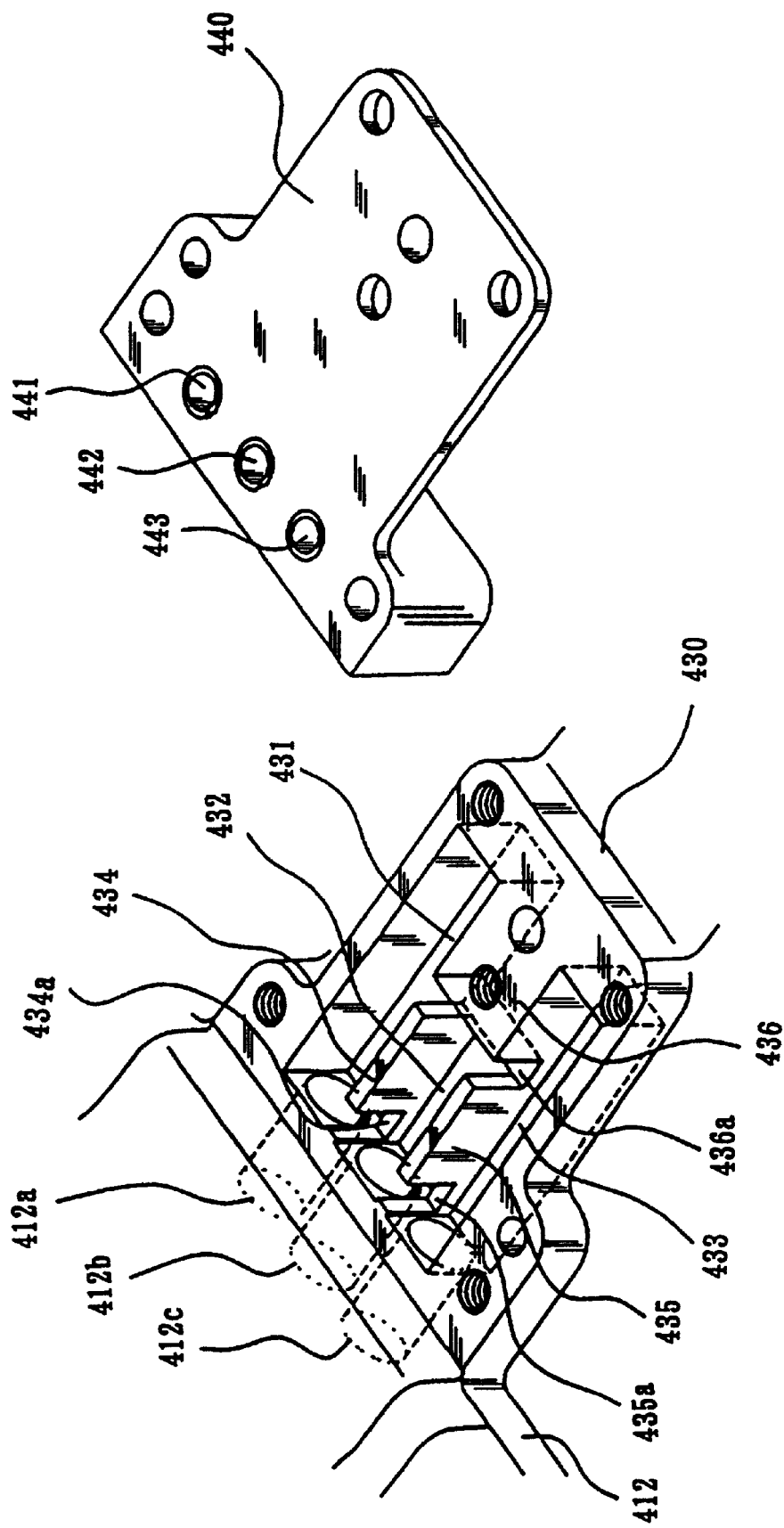
FIG. 23 is an exploded perspective view of H portion of FIG. 20 with no fork shaft being attached.

FIG. 23 shows an enlarged view of the housing grooves having no fork shafts supported therein yet. As shown in FIG. 23, the respective housing grooves 431, 432 and 433 are opened in the upper portion. Further, the second housing groove 432 located at a mid portion as viewed from above is designed to be shorter by a predetermined length than the first and third housing grooves 431 and 433 astride of the second housing groove 432. Further, the side walls 434, 435 and 436 defining the respective grooves are provided with cutouts 434a, 435a and 436a that communicate the each two of the three grooves. More specifically, the cutouts 434a, 435a and 436a constitute communication grooves that communicate the first housing groove 431 with the second housing groove 432, the second housing groove 432 with the third housing groove 433, and the first housing groove 431 with the third housing groove 433, respectively.

As shown in FIG. 21, an interlock plunger 437 for the first and second fork shafts, an interlock plunger 438 for the second and third fork shafts and an interlock plunger 439 for the first and third shafts are disposed in the cutouts 434a, 435a and 436a, respectively. The respective cutouts are formed perpendicular to the axial directions of the fork shafts, defining the retainers that can move the respective plungers only along the directions perpendicular to the axial directions of fork shafts. According to the present embodiment, the extension is provided with the housing grooves defined by the side walls, and the cutouts are used as the interlock holders. Alternatively, it is possible to employ an extension having a substantially flat bottom on which projections for holding the interlock plungers are formed.

Further, in order to form the interlock system, recesses 421A and 421B are formed in the inner side of the first fork shaft 421, recesses 422A and 422B are formed in the both outer sides of the second fork shafts 422, and recesses 423A and 423B are formed in the inner side of the third fork shaft 423. The respective recesses are formed so as to engage the respective interlock plungers when the corresponding fork shafts turn the gear type change speed mechanism to be neutral. More specifically, when the first fork shaft 421, for example, is moved in one of the opposite axial directions, the interlock plunger 437 for the first and second fork shafts is forced into the recess 422A of the second fork shaft, and the interlock plunger 439 for the first–third shafts is forced into the recess 423B of the third fork shaft, thereby locking the second and third fork shafts non-slidable. Thus, the interlock mechanism is produced which can prevent two or more forks from sliding at the same time.

Further, as shown in FIGS. 20 and 23, a cover 440 for closing the upper openings of the housing grooves and the cutouts is detachably attached to the casing 410 by fixing means such as bolts. The cover 440 is provided with a detent system.

Figure 24:
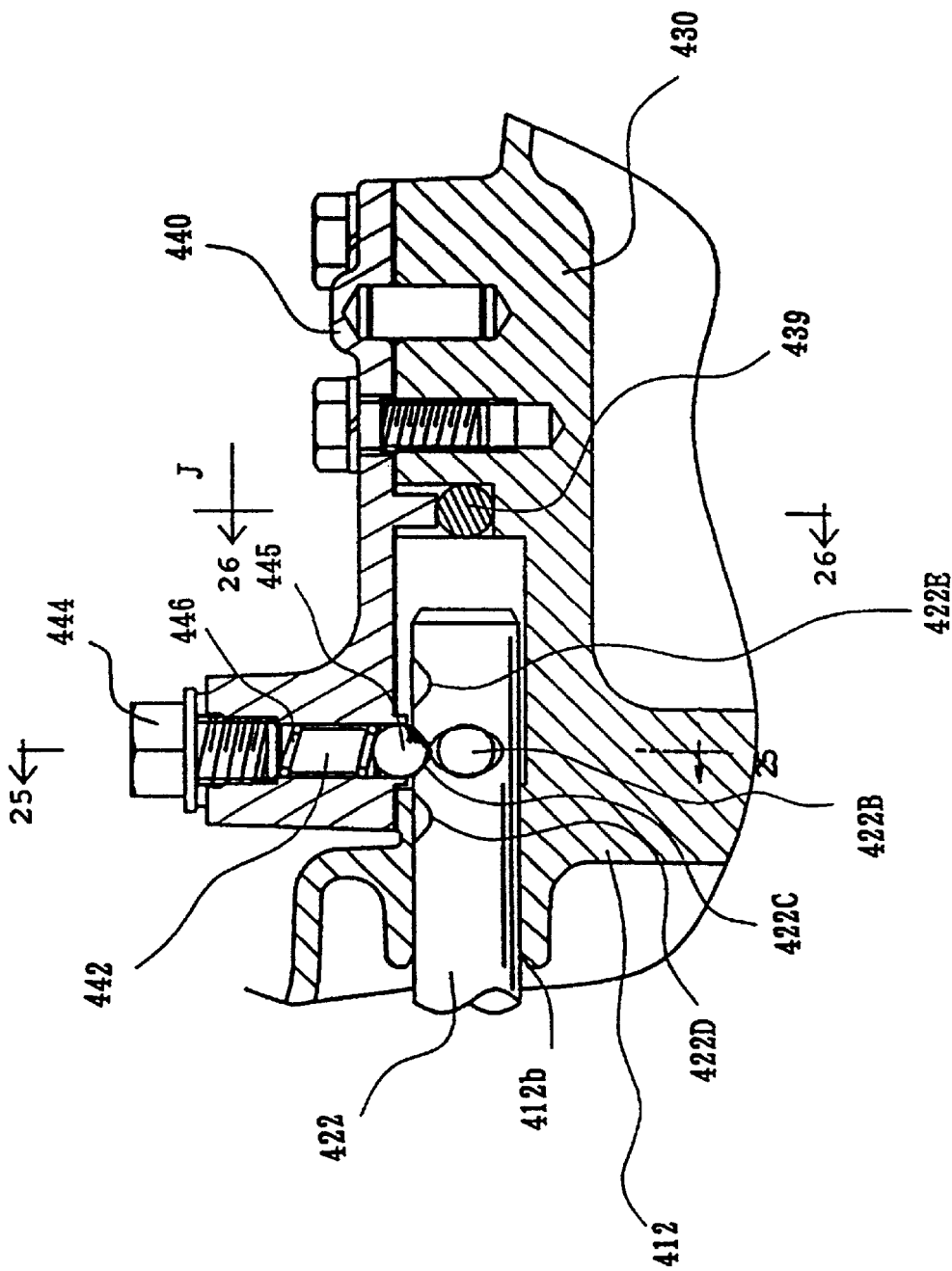
FIG. 24 is an enlarged view of H portion of FIG. 20.

The cover 440 will be explained in detail below with reference to FIGS. 24–26. FIG. 24 is an enlarged view of the H portion in FIG. 20, and FIGS. 25 and 26 are cross sections taken along Line 25—25 and Line 26—26, respectively.

Figure 25:
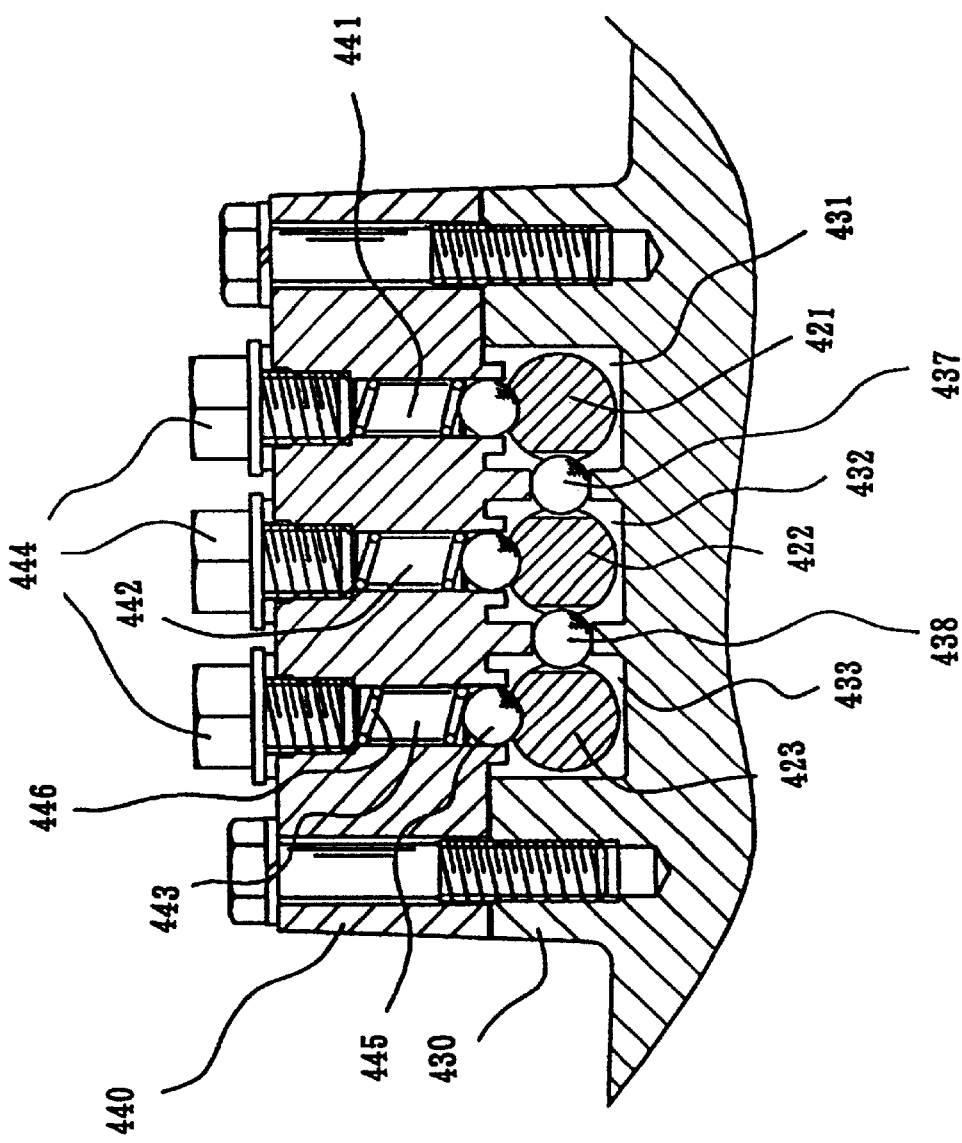
FIG. 25 is a cross section taken along Line 25—25 of FIG. 24.
Figure 26:
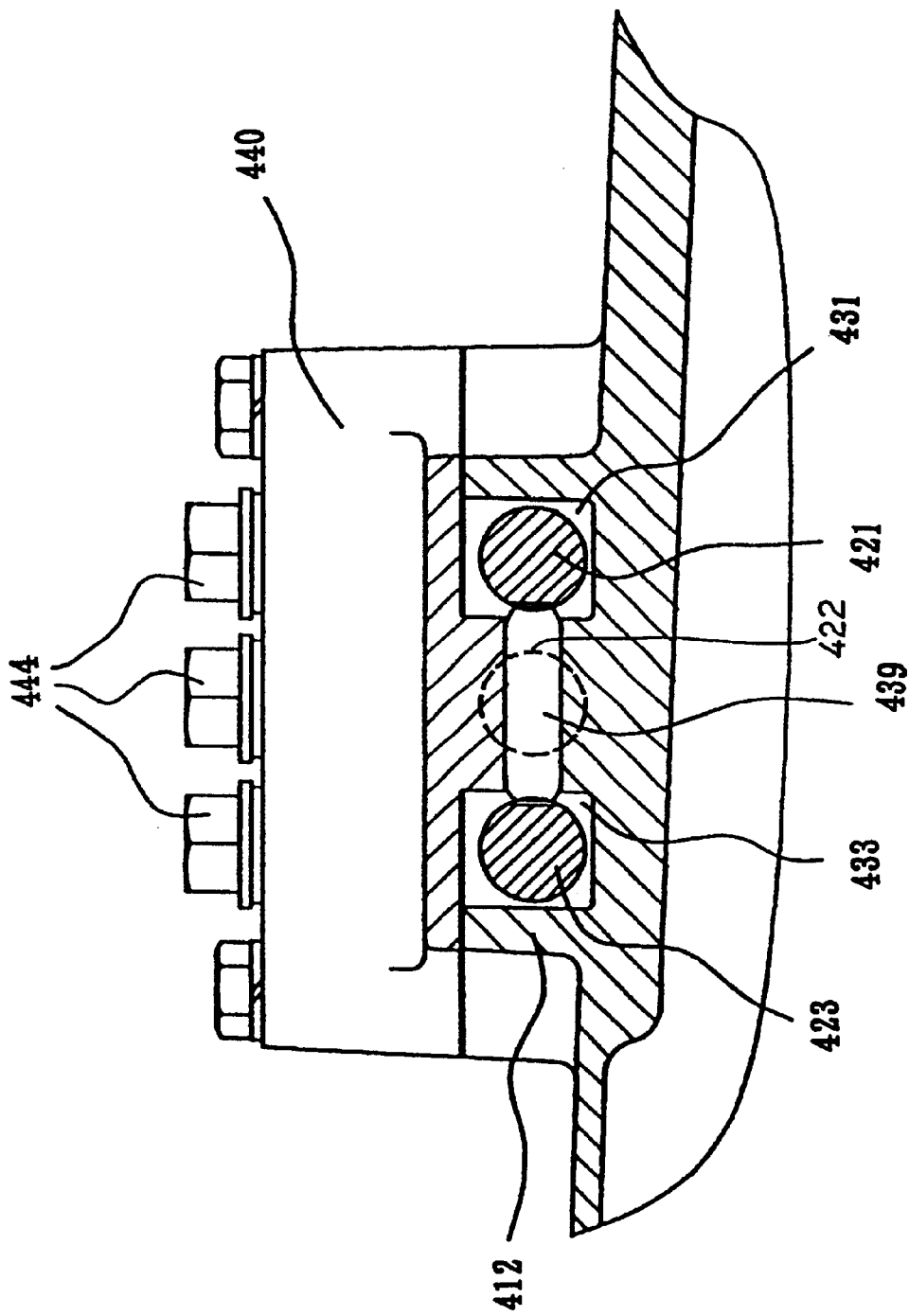
FIG. 26 is a cross section taken along Line 26—26 of FIG. 24.

As shown in FIGS. 24–26, the cover 440 is provided with through holes 441, 442 and 443 which communicate the respective housing grooves with the upper face of the cover. On the other hand, the respective fork shafts have a set of three recesses, i) 421C, 421D 421E, ii) 422C, 422D and 422E, and iii) 423C, 423D and 423E, respectively formed in their upper faces (see FIG. 20). Among the recesses, the in-between recesses 421C, 422C and 423C are the recesses for the neutral position which are formed to face the through holes 441, 442 and 443, respectively, when the corresponding gear type change speed mechanisms are in the neutral state. Formed astride of the recesses 421C, 422C and 423C for the neutral position in the axial directions are the change speed recesses 421D, 421E; 422D, 422E; and 423D, 423E, respectively. The respective change speed recesses are located so as to face the through holes when the corresponding gear type change speed mechanisms are in changing state.

The upper ends of the respective through holes are closed by position adjusters 444 that are position-adjustably inserted axially of the through holes. Various means such as bolts are usable as the position adjusters. Inserted between the upper faces of the respective fork shafts 421, 422 and 423 and the lower ends of the position adjusters 444 are spherical detent plungers 445 and biasing members 446 for pressing the detent plungers upside of the fork shafts. According to the present embodiment, the provision of the cover 440 having the detent mechanism can prevent the slippage off of the interlock plungers 437, 438 and 439 disposed in the cutouts 434a, 435a and 436a and can prevent the slippage of the fork shafts 421, 442 and 423 located at the neutral position and the respective change speed positions. Further, the driver can feel an appropriate response feeling due to the detent mechanism, thereby conducting suitable shift operation.

According to the thus constructed transmission, it is not necessary to alternatively attach a fork and an interlock plunger in assembling fork shafts, i.e., attach a first fork shaft and thereafter attach an interlock plunger for first and second shafts as in the prior art, thereby attaching the fork shafts and the interlock plungers independently. More specifically, it is possible to dispose all the interlock plungers 437, 438 and 439 in the cutouts 434a, 435a and 436a from above after attaching the respective fork shafts 421, 422 and 423 independently to the casing 410 and thereafter attach the cover 440, thereby improving the assembling efficiency of the interlock mechanism to a large extent.

Further, it is possible to assemble the detent mechanism of the present embodiment after mounting the cover 440 on the transmission casing 410, thereby preventing the assembling efficiency of the transmission from being lowered due to the provision of the detent mechanism.

Still further, it is necessary for the hunger member of prior art to bore in three directions. On the contrary, according to the present embodiment, the shaft holes are formed in the casing integrally, whereby boring has to be conducted in the closure member only in one direction. Accordingly, it is possible to reduce the production cost in terms of the hole boring cost.

Figure 27:
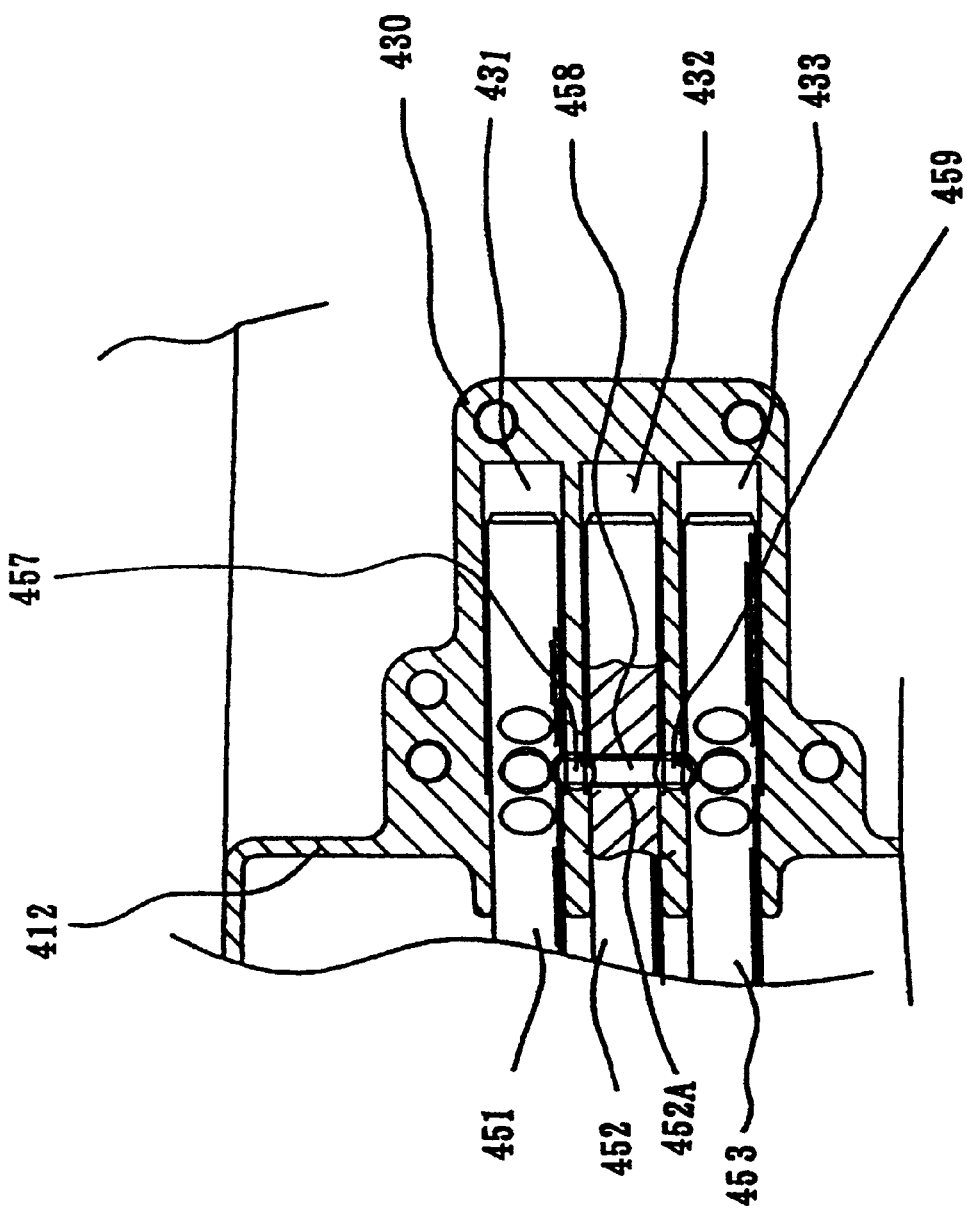
FIG. 27 is a partial transverse cross section showing a variant embodiment of the transmission shown in FIG. 20.
Figure 28:
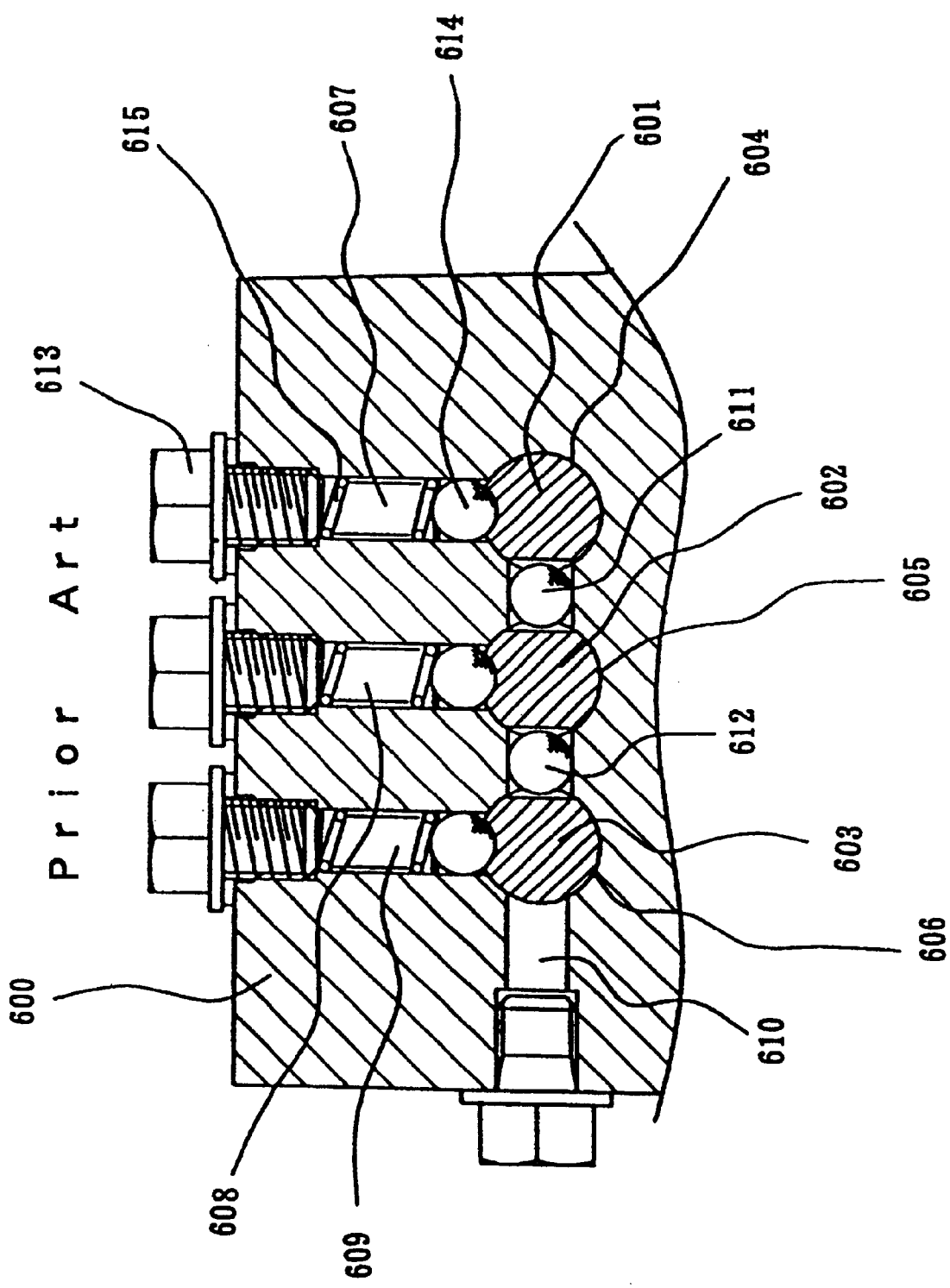
FIG. 28 is a cross section showing an interlock mechanism and a detent mechanism in a prior art transmission.

The main object of the present invention is to enable it to attach the fork shafts and dispose the plungers independently so as to improve the assembling efficiency of the transmission comprising an interlock mechanism. Therefore, the present invention can also be applied to various types of interlock mechanisms. More specifically, the present embodiment comprises an interlock mechanism having interlock plungers between the respective two shafts. In lieu of this, it is also possible to i) arrange the first, second and third fork shafts 451, 452 and 453 in the same plane as shown in FIG. 27, ii) form the through hole 452A that is located perpendicular to the axial direction of the second fork shaft 452A and resides in the said same plane, iii) insert an interlock plunger 458 of column shape into the through hole 452A, and iv) dispose spherical interlock plungers 457 and 459 between the first–second fork shafts and between the second–third fork shafts to use an interlock mechanism. Further, according to the present embodiment, three fork shafts are used, but the present invention is not limited thereto and can be applied to the transmission having two or more than three fork shafts.

What is claimed is:

1. A transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other, wherein the transmission comprises a plurality of gear type change speed devices each of which comprises a rotatable gear supported on one of the drive and driven shafts; a synchromesh device supported on the one of said drive and driven shafts so as to be axially slidable but non-rotatable relative thereto, said synchromesh device being designed to be synchronizedly connected with the corresponding rotatable gear by a friction face and thereafter a meshing portion provided on the rotatable gear, and a fixed gear supported on the other shaft of the drive and driven shafts in a non-rotatable manner and operatively coupled to the corresponding rotatable gear, wherein the synchromesh device of selected one of the plurality of gear type change speed devices is moved to mesh with the corresponding rotatable gear such that the rotatable gear is synchronized with said one of the shafts and rotates the driven shaft at a desired speed via the corresponding fixed gear operatively coupled to the rotatable gear, wherein i) at least the rotatable gear operatively coupled to the corresponding fixed gear having the smallest pitch circle among the plurality of fixed gears and ii) the synchromesh device corresponding to said rotatable gear operatively coupled to said fixed gear with the smallest pitch circle are mounted on the driven shaft, wherein the casing has an opening at its front end, wherein an operating device is provided in the casing to operate the gear type change speed devices, said operating device comprising:

a plurality of shift forks to engage the sychromesh devices of the gear type change speed devices;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing; and said shift shaft being supported by opposing side walls of the transmission casing rotatable relative thereto, wherein both ends of the shift shaft are extended outwardly beyond the opposing side walls of the transmission casing, and the extended portions of the shift shaft are capable of being provided with a shift lever which is non-rotatable relative to the shift shaft.

2. A transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other, wherein the transmission comprises a plurality of gear type change speed devices each of which comprises a rotatable gear supported on one of the drive and driven shafts; a synchromesh device supported on the one of said drive and driven shafts so as to be axially slidable but non-rotatable relative thereto, said synchromesh device being designed to be synchronizedly connected with the corresponding rotatable gear by a friction face and thereafter a meshing portion provided on the rotatable gear, and a fixed gear supported on the other shaft of the drive and driven shafts in a non-rotatable manner and operatively coupled to the corresponding rotatable gear, wherein the synchromesh device of selected one of the plurality of gear type change speed devices is moved to mesh with the corresponding rotatable gear such that the rotatable gear is synchronized with said one of the shafts and rotates the driven shaft at a desired speed via the corresponding fixed gear operatively coupled to the rotatable gear, wherein i) at least the rotatable gear operatively coupled to the corresponding fixed gear having the smallest pitch circle among the plurality of fixed gears and ii) the synchromesh device corresponding to said rotatable gear operatively coupled to said fixed gear with the smallest pitch circle are mounted on the driven shaft, wherein the casing has an opening at its front end, wherein an operating device is provided in the casing to operate the gear type change speed devices, said operating device comprising:

a plurality of shift forks to engage the sychromesh devices of the gear type change speed devices;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatably relative thereto, wherein at least one of the transmission casing side walls is provided with an opening having a larger diameter than the maximum width of the control member and is provided detachably with a member for closing the opening, and wherein the closing member is provided with a bearing for supporting the shift shaft rotatably.

3. A transmission according to claim 2, wherein the closure member is provided with a neutral position detecting member for detecting the neutral position of the control arm.

4. A transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other, wherein the transmission comprises a plurality of gear type change speed devices each of which comprises a rotatable gear supported on one of the drive and driven shafts; a synchromesh device supported on the one of said drive and driven shafts so as to be axially slidable but non-rotatable relative thereto, said synchromesh device being designed to be synchronizedly connected with the corresponding rotatable gear by a friction face and thereafter a meshing portion provided on the rotatable gear, and at least one fixed first speed gear of forward speed change gears and a fixed reversing gear, both of which are supported on the other shaft of the drive and driven shafts in a non-rotatable manner and operatively coupled to the corresponding rotatable gear, wherein the synchromesh device of selected one of the plurality of gear type change speed devices is moved to mesh with the corresponding rotatable gear such that the rotatable gear is synchronized with said one of the shafts and rotates the driven shaft at a desired speed via the corresponding fixed gear operatively coupled to the rotatable gear, wherein the casing has an opening at its front end, wherein an operating device is provided in the casing to operate the gear type change speed devices, said operating device comprising:

a plurality of shift forks to engage the sychromesh devices of the gear type change speed devices;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatably relative thereto, wherein the shift shaft is provided with a pair of biasing members for biasing the control arm to the neutral position corresponding to the movement of the control arm, wherein one biasing member of said pair of biasing members has a different biasing force than a second biasing member of said pair of biasing members.

5. A transmission, comprising (a) an input shaft operatively coupled to a power source, (b) an output shaft for outputting drive power, (c) an intermediate shaft provided between the input shaft and the output shaft for transmitting power from the input shaft to the output shaft, (d) a casing rotatable supporting the input shaft, the output shaft, and the intermediate shaft, and (e) first gear-changing devices, each comprising:

a fixed first speed gear of forward speed change gears and a fixed reversing gear, both of which are non-rotatably supported on the input shaft, an idle gear supported rotatable on an idle shaft which is supported by a wall of the housing adjacent to the reversing gear;

a rotatable gear rotatable supported on the intermediate shaft and operatively coupled to the fixed first-speed gear; and a synchromesh device supported on the intermediate shaft and being axially slidable but non-rotatable relative thereto to synchronizedly connect the rotatable gear with the intermediate shaft when the synchromesh device slides to mesh with the rotatable gear, thereby rotating at a desired speed the intermediate shaft with the rotatable gear via the fixed first-speed gear to rotate the output shaft, wherein one of the fixed gears supported on the input shaft has the smallest pitch circle among the fixed and rotatable gears, wherein the casing has an opening at its front end, wherein an operating device is provided in the casing to operate the gear-changing devices, said operating device comprising:

a plurality of shift forks to engage the sychromesh devices, each shift fork having a receiving portion formed therein;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatable relative thereto, wherein the both ends of the shift shaft are extended outwardly beyond the opposing side walls of the transmission casing, and the extended portions of the shift shaft are capable of being provided with a shift lever which is non-rotatable relative to the shift shaft.

6. A transmission, comprising (a) an input shaft operatively coupled to a power source, (b) an output shaft for outputting drive power, (c) an intermediate shaft provided between the input shaft and the output shaft for transmitting power from the input shaft to the output shaft, (d) a casing rotatably supporting the input shaft, the output shaft, and the intermediate shaft, and (e) first gear-changing devices, each comprising:

a fixed first speed gear of forward speed change gears and a fixed reversing gear, both of which are non-rotatably supported on the input shaft, an idle gear supported rotatable on an idle shaft which is supported by a wall of the housing adjacent to the reversing gear;

a rotatable gear rotatable supported on the intermediate shaft and operatively coupled to the fixed first-speed gear; and a synchromesh device supported on the intermediate shaft and being axially slidable but non-rotatable relative thereto to synchronizedly connect the rotatable gear with the intermediate shaft when the synchromesh device slides to mesh with the rotatable gear, thereby rotating at a desired speed the intermediate shaft with the rotatable gear via the fixed first-speed gear to rotate the output shaft, wherein one of the fixed gears supported on the input shaft has the smallest pitch circle among the fixed and rotatable gears, wherein the casing has an opening at its front end, wherein an operating device is provided in the casing to operate the gear-changing devices, said operating device comprising:

a plurality of shift forks to engage the sychromesh devices, each shift fork having a receiving portion formed therein;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatable relative thereto, wherein at least one of the transmission casing side walls is provided with an opening having a larger diameter than the maximum width of the control member and is provided detachably with a member for closing the opening, and wherein the closing member is provided with a bearing for supporting the shift shaft rotatably.

7. The transmission according to claim 6, wherein the closure member is provided with a neutral position detecting member for detecting the neutral position of the control arm.

8. A transmission, comprising (a) an input shaft operatively coupled to a power source, (b) an output shaft for outputting drive power, (c) an intermediate shaft provided between the input shaft and the output shaft for transmitting power from the input shaft to the output shaft, (d) a casing rotatable supporting the input shaft, the output shaft, and the intermediate shaft, and (e) first gear-changing devices, each comprising:

a fixed first speed gear of forward speed change gears and a fixed reversing gear, both of which are non-rotatably supported on the input shaft, an idle gear supported rotatably on an idle shaft which is supported by a wall of the housing adjacent to the reversing gear;

a rotatable gear rotatable supported on the intermediate shaft and operatively coupled to the fixed first-speed gear; and a synchromesh device supported on the intermediate shaft and being axially slidable but non-rotatable relative thereto to synchronizedly connect the rotatable gear with the intermediate shaft when the synchromesh device slides to mesh with the rotatable gear, thereby rotating at a desired speed the intermediate shaft with the rotatable gear via the fixed first-speed gear to rotate the output shaft, wherein one of the fixed gears supported on the input shaft has the smallest pitch circle among the fixed and rotatable gears, wherein the casing has an opening at its front end, wherein an operating device is provided in the casing to operate the gear-changing devices, said operating device comprising:

a plurality of shift forks to engage the sychromesh devices, each shift fork having a receiving portion formed therein;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatably relative thereto, wherein the shift shaft is provided with a pair of biasing members for biasing the control arm to the neutral position corresponding to the movement of the control arm, wherein one biasing member of said pair of biasing members has a different biasing force than a second biasing member of said pair of biasing members.

9. A transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other, wherein the transmission comprises a plurality of gear type change speed devices each of which comprises a rotatable gear supported on one of the drive and driven shafts; a synchromesh device supported on the one of said drive and driven shafts so as to be axially slidable but non-rotatable relative thereto, said synchromesh device being designed to be synchronizedly connected with the corresponding rotatable gear by a friction face and thereafter a meshing portion provided on the rotatable gear, and a fixed gear supported on the other shaft of the drive and driven shafts in a non-rotatable manner and operatively coupled to the corresponding rotatable gear, wherein the synchromesh device of selected one of the plurality of gear type change speed devices is moved to mesh with the corresponding rotatable gear such that the rotatable gear is synchronized with said one of the shafts and rotate the driven shaft at a desired speed via the corresponding fixed gear operatively coupled to the rotatable gear, wherein the casing has an opening at its front end, wherein an operating device is provided in the casing to operate the gear type change speed devices, said operating device comprising:

a plurality of shift forks to engage the sychromesh devices of the gear type change speed devices;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing; and said shift shaft being supported by opposing side walls of the transmission casing rotatably relative thereto, wherein the both ends of the shift shaft are extended outwardly beyond the opposing side walls of the transmission casing, and the extended portions of the shift shaft are capable of being provided with a shift lever which is non-rotatable relative to the shift shaft.

10. A transmission comprising a casing and a plurality of rotatable shafts supported by the casing, the plurality of the rotatable shafts including at least an input shaft operatively coupled to a power source and an output shaft for outputting the drive power transmitted from the input shaft, and the change speed operation of the transmission being conducted between a pair of drive and driven shafts among the rotatable shafts, the pair of drive and driven shafts being disposed adjacent and substantially in parallel to each other, wherein the transmission comprises a plurality of gear type change speed devices each of which comprises a rotatable gear supported on one of the drive and driven shafts; a synchromesh device supported on the one of said drive and driven shafts so as to be axially slidable but non-rotatable relative thereto, said synchromesh device being designed to be synchronizedly connected with the corresponding rotatable gear by a friction face and thereafter a meshing portion provided on the rotatable gear, and a fixed gear supported on the other shaft of the drive and driven shafts in a non-rotatable manner and operatively coupled to the corresponding rotatable gear, wherein the synchromesh device of selected one of the plurality of gear type change speed devices is moved to mesh with the corresponding rotatable gear such that the rotatable gear is synchronized with said one of the shafts and rotate the driven shaft at a desired speed via the corresponding fixed gear operatively coupled to the rotatable gear, wherein the casing has an opening at its front end, wherein an operating device is provided in the casing to operate the gear type change speed devices, said operating device comprising:

a plurality of shift forks to engage the sychromesh devices of the gear type change speed devices;

a plurality of fork shafts supporting each of the shift forks in a longitudinally slidable manner;

a control member having an arm to engage a selected one of the receiving portions formed in the shift forks; and a shift shaft supporting the control member in axially slidable but non-rotatable manner relative to the shift shaft, said fork shafts being supported by a rear wall of the transmission casing and a closure wall closing the front opening of the transmission casing;

said shift shaft being supported by opposing side walls of the transmission casing rotatably relative thereto, wherein at least one of the transmission casing side walls is provided with an opening having a larger diameter than the maximum width of the control member and is provided detachably with a member for closing the opening, and wherein the closing member is provided with a bearing for supporting the shift shaft rotatably.

* * * * *